(12) United States Patent
Imai et al.

(10) Patent No.: US 10,171,798 B2
(45) Date of Patent: Jan. 1, 2019

(54) LIQUID CRYSTAL LENTICULAR LENS ELEMENT, DRIVING METHOD THEREFOR, STEREOSCOPIC DISPLAY DEVICE, AND TERMINAL DEVICE

(71) Applicant: NLT TECHNOLOGIES, LTD., Kawasaki, Kanagawa (JP)

(72) Inventors: Ayuko Imai, Kanagawa (JP); Ken Sumiyoshi, Kanagawa (JP); Hidenori Ikeno, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 189 days.

(21) Appl. No.: 15/118,727

(22) PCT Filed: Feb. 13, 2015

(86) PCT No.: PCT/JP2015/053911
§ 371 (c)(1),
(2) Date: Aug. 12, 2016

(87) PCT Pub. No.: WO2015/122480
PCT Pub. Date: Aug. 20, 2015

(65) Prior Publication Data
US 2017/0048515 A1    Feb. 16, 2017

(30) Foreign Application Priority Data

Feb. 14, 2014 (JP) ................. 2014-026478

(51) Int. Cl.
*H04N 9/47* (2006.01)
*H04N 13/305* (2018.01)
(Continued)

(52) U.S. Cl.
CPC ....... *H04N 13/305* (2018.05); *G02B 27/2214* (2013.01); *G02F 1/137* (2013.01);
(Continued)

(58) Field of Classification Search
USPC ..................................... 348/59, 51
See application file for complete search history.

(56) References Cited

U.S. PATENT DOCUMENTS 8,988,619 B2    3/2015  Oka et al.
9,354,449 B2    3/2016  Miyazawa et al.
(Continued)

FOREIGN PATENT DOCUMENTS

CN    102207632 A    10/2011
CN    102231020 A    11/2011
(Continued)

OTHER PUBLICATIONS

International Search Report for PCT/JP2015/053911 dated Apr. 7, 2015.
(Continued)

*Primary Examiner* — Nigar Chowdhury
(74) *Attorney, Agent, or Firm* — Sughrue Mion, PLLC

(57) ABSTRACT

A liquid crystal lenticular lens element that: comprises a first substrate, a second substrate that is parallel thereto, a liquid crystal layer that is provided between the substrates, a first electrode that is formed on the liquid crystal layer side of the first substrate, and a second electrode comprising a plurality of stripe-shaped electrodes that are formed on the liquid crystal layer side of the second substrate; and that is characterized by having a configuration in which a stripe-shaped repeating structure that comprises a repeating unit along the arrangement direction of the second electrode is formed and an asymmetrical refractive index distribution is induced on a plane that bisects each of the repeating units in a direction that is perpendicular to the arrangement direction by applying an electrical signal from the exterior to each of the electrodes.

12 Claims, 24 Drawing Sheets

(51) Int. Cl.

| | | |
|---|---|---|
| H04N 13/31 | (2018.01) | |
| H04N 13/366 | (2018.01) | |
| H04N 13/383 | (2018.01) | |
| H04N 13/398 | (2018.01) | |
| G03B 35/24 | (2006.01) | |
| G02F 1/29 | (2006.01) | |
| G02B 27/22 | (2018.01) | |
| G02F 1/1335 | (2006.01) | |
| G02F 1/1339 | (2006.01) | |
| G02F 1/1343 | (2006.01) | |
| G02F 1/137 | (2006.01) | |

(52) U.S. Cl.
CPC ...... *G02F 1/13394* (2013.01); *G02F 1/13439* (2013.01); *G02F 1/133512* (2013.01); *G02F 1/134309* (2013.01); *G02F 1/29* (2013.01); *G03B 35/24* (2013.01); *H04N 13/31* (2018.05); *H04N 13/366* (2018.05); *H04N 13/383* (2018.05); *H04N 13/398* (2018.05); *G02F 2001/294* (2013.01); *H04N 2213/001* (2013.01)

(56) References Cited

U.S. PATENT DOCUMENTS

| | | | | |
|---|---|---|---|---|
| 2004/0169630 | A1* | 9/2004 | Ide | G02F 1/134309 345/96 |
| 2008/0259233 | A1* | 10/2008 | Krijn | H04N 13/0029 349/15 |
| 2010/0159181 | A1* | 6/2010 | Kelmartin | B32B 27/12 428/57 |
| 2011/0249221 | A1* | 10/2011 | Uchida | G02B 6/005 349/65 |
| 2012/0113336 | A1* | 5/2012 | Kim | G02F 1/134363 349/15 |
| 2012/0120331 | A1* | 5/2012 | Oka | G02B 27/2214 349/15 |
| 2012/0162592 | A1* | 6/2012 | Takagi | G02B 27/2214 349/139 |
| 2012/0218490 | A1 | 8/2012 | Takama et al. | |
| 2012/0293503 | A1* | 11/2012 | Miyazawa | G02B 27/2214 345/419 |
| 2013/0222753 | A1* | 8/2013 | Koito | G02F 1/1339 349/153 |
| 2013/0250195 | A1* | 9/2013 | Koito | G02F 1/1313 349/15 |

FOREIGN PATENT DOCUMENTS

| | | |
|---|---|---|
| CN | 102540527 A | 7/2012 |
| CN | 102809865 A | 12/2012 |
| JP | 2-44995 A | 2/1990 |
| JP | 2662252 B2 | 10/1997 |
| JP | 2920051 B2 | 7/1999 |
| JP | 2009-520232 A | 5/2009 |
| JP | 2012-108194 A | 6/2012 |
| JP | 2012-141552 A | 7/2012 |
| JP | 2012-173715 A | 9/2012 |
| JP | 2012-242681 A | 12/2012 |
| WO | 2007/072330 A1 | 6/2007 |

OTHER PUBLICATIONS

Communication dated Sep. 4, 2018, from the State Intellectual Property Office of People's Republic of China in counterpart Application No. 201580008062.X.

* cited by examiner

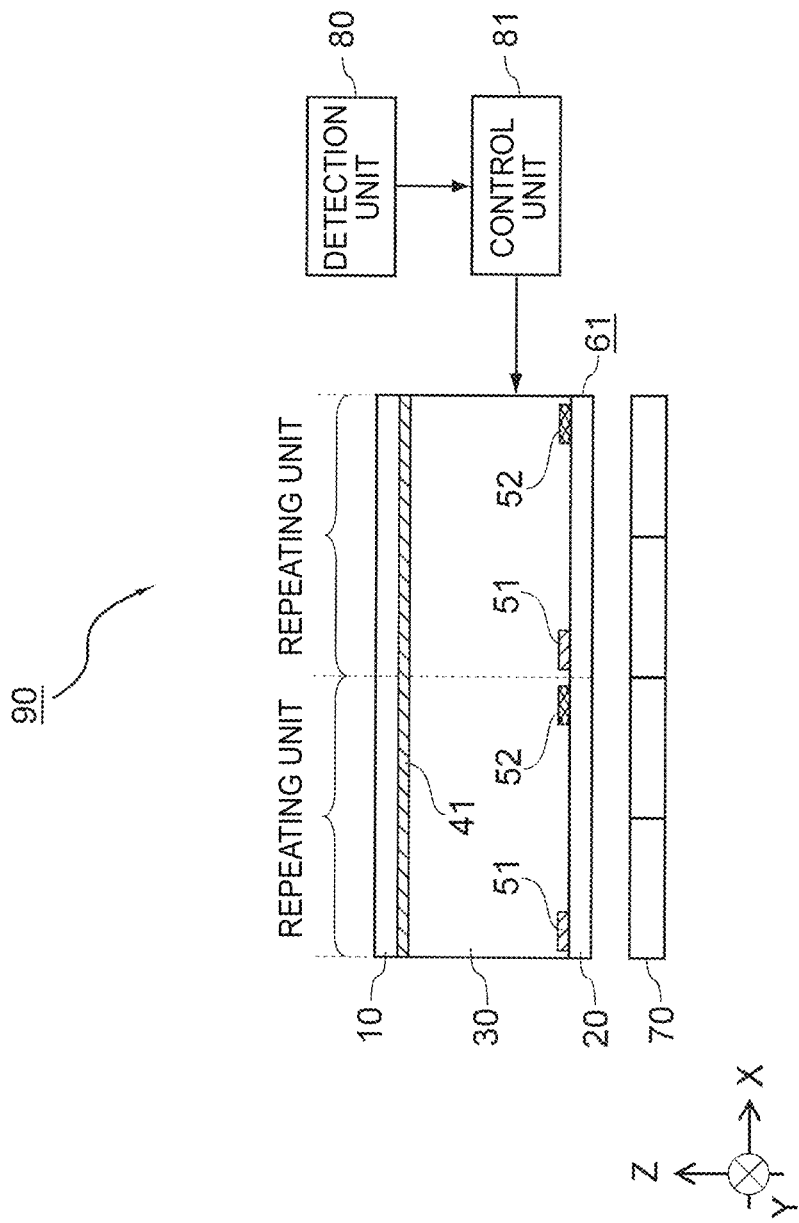

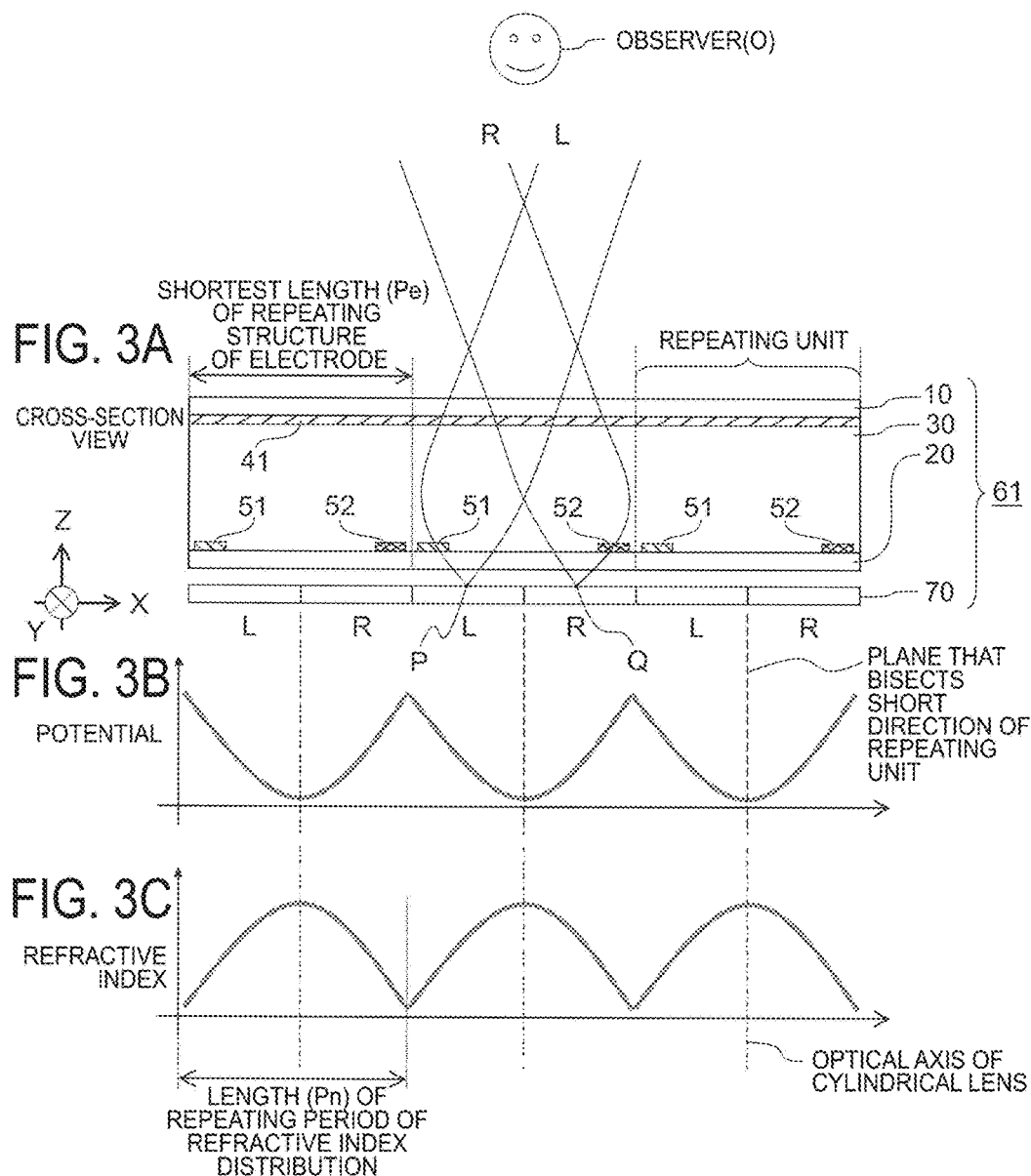

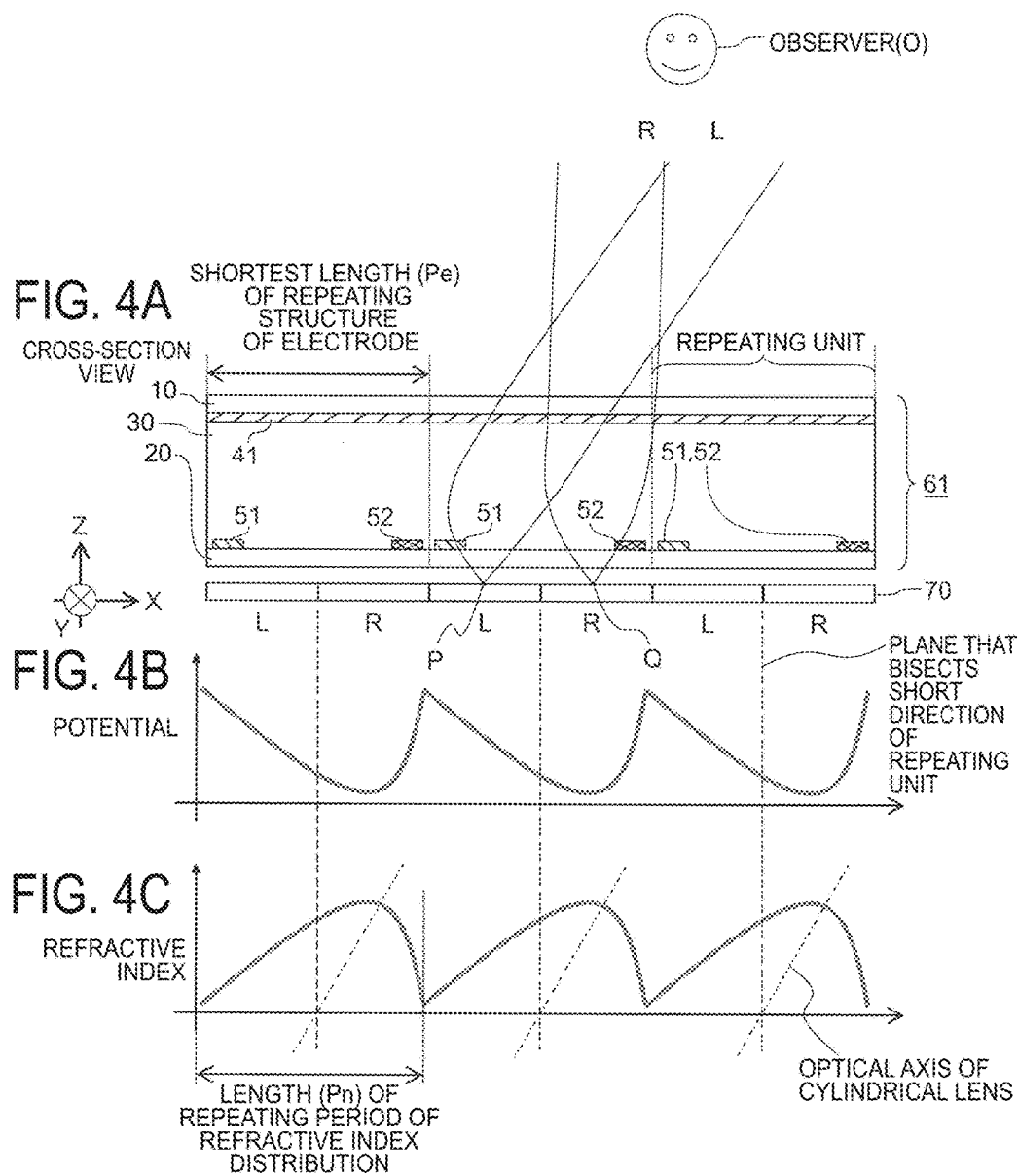

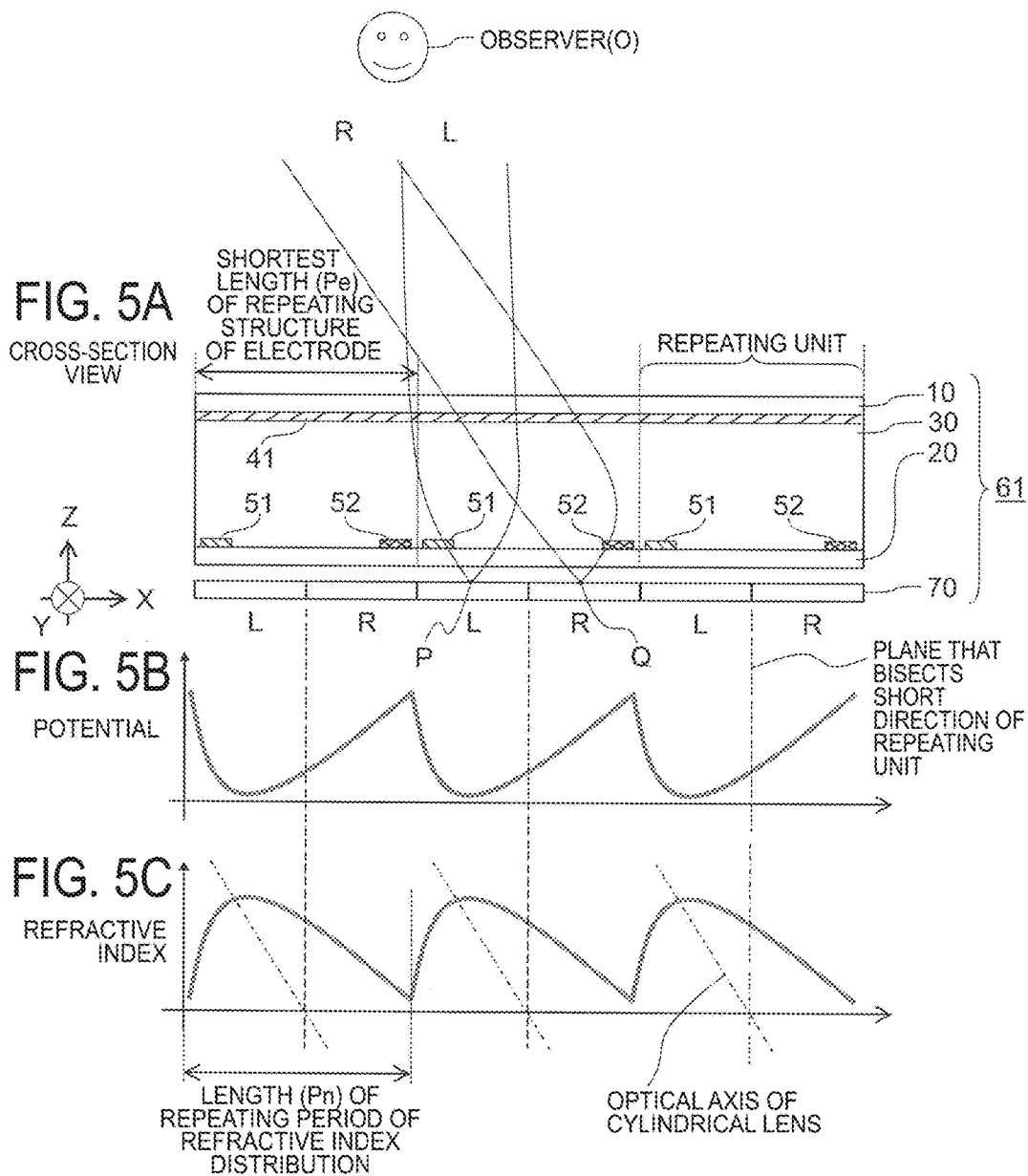

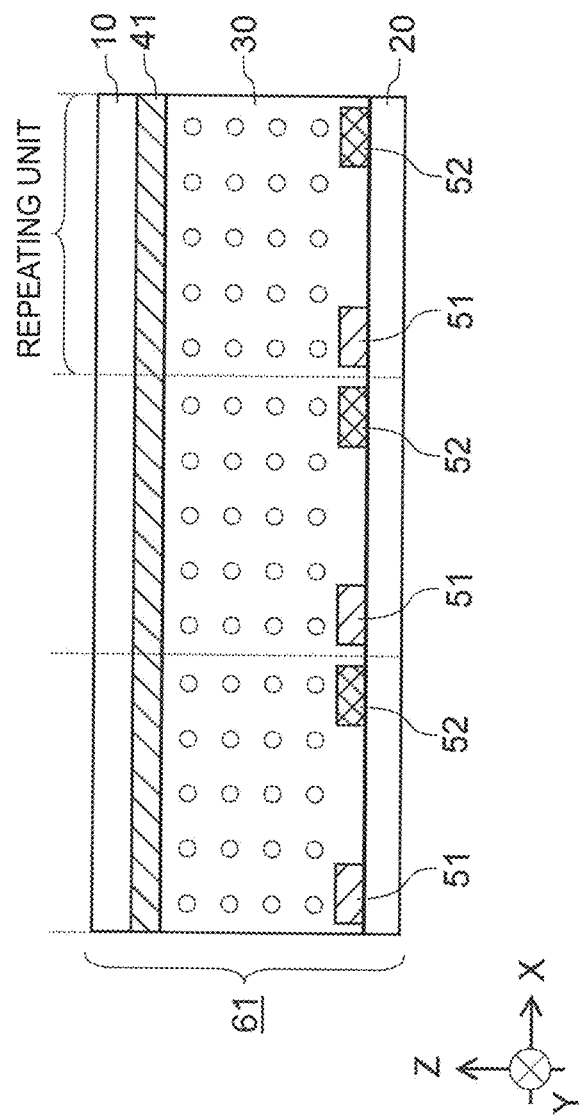

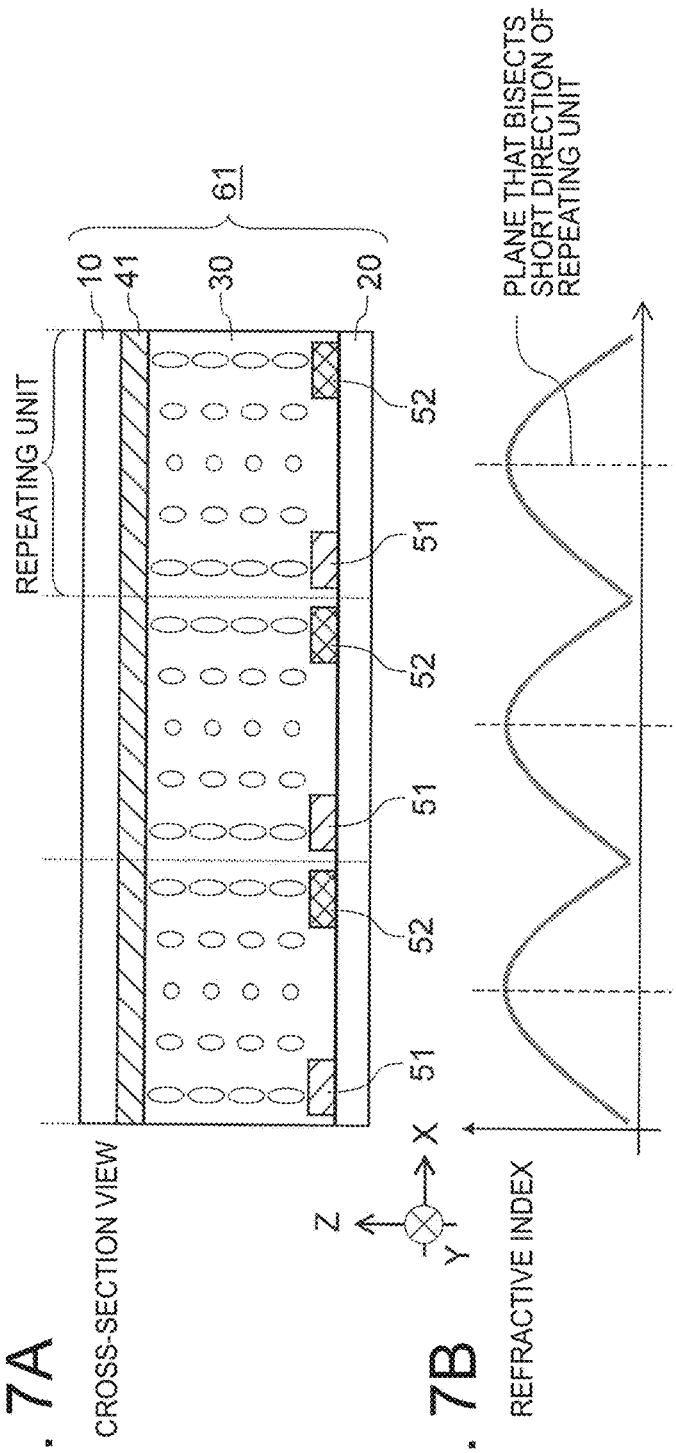

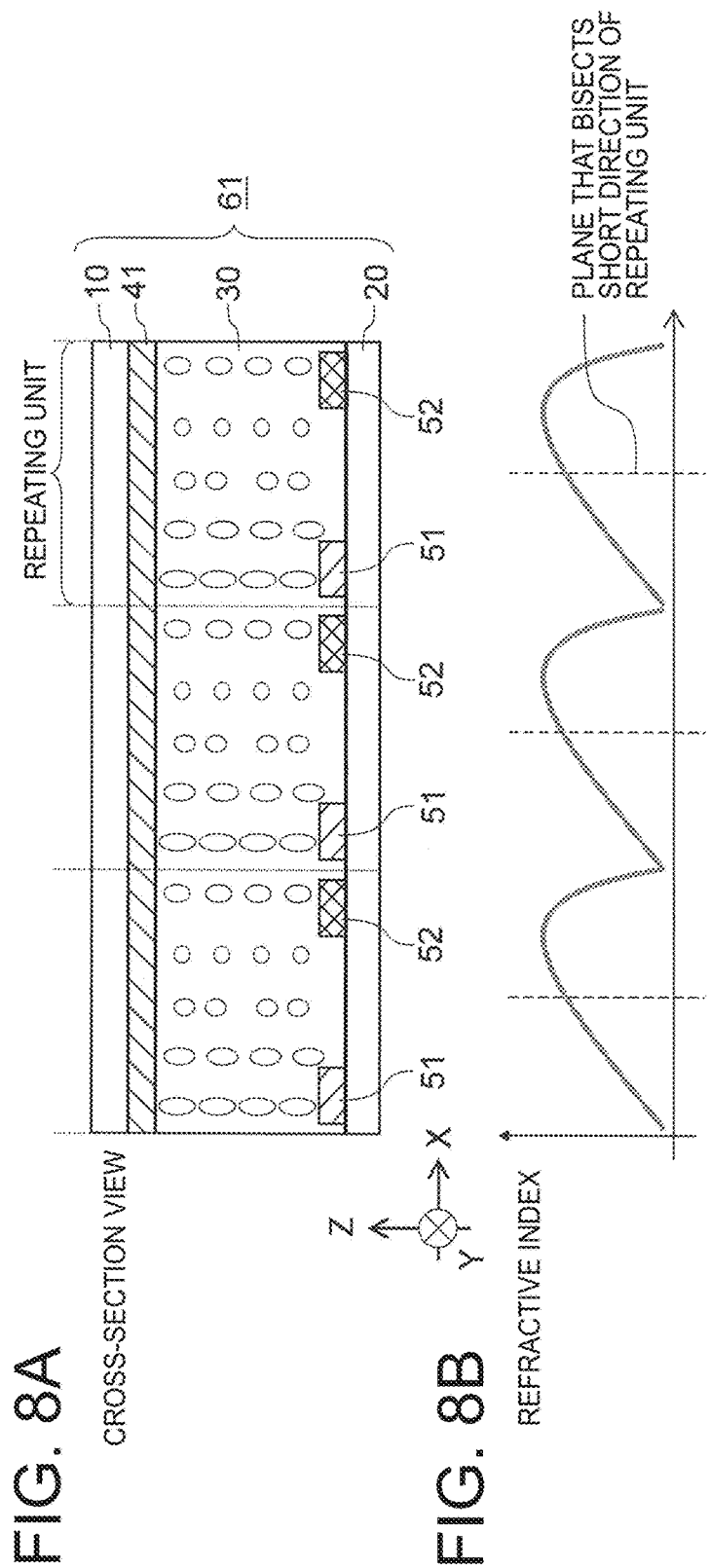

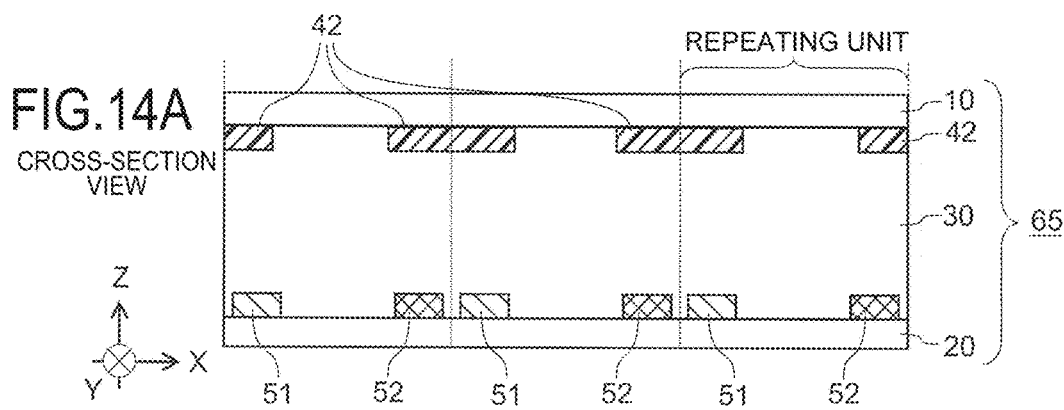
FIG.14A CROSS-SECTION VIEW
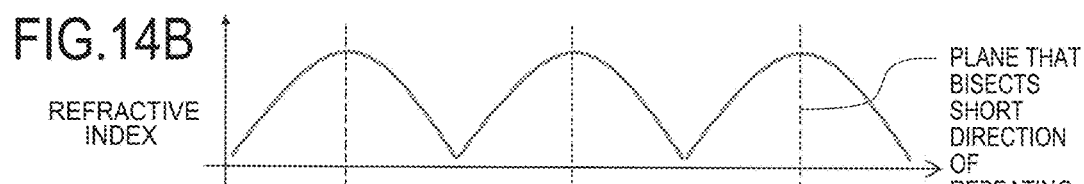
FIG.14B REFRACTIVE INDEX
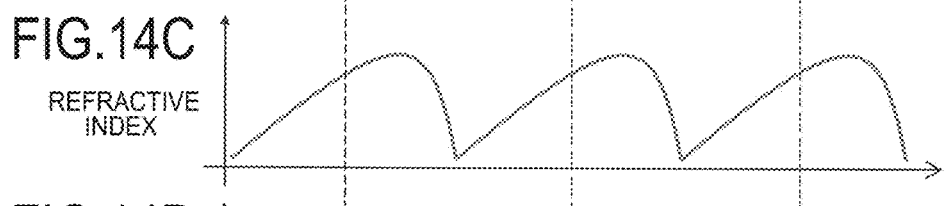
FIG.14C REFRACTIVE INDEX
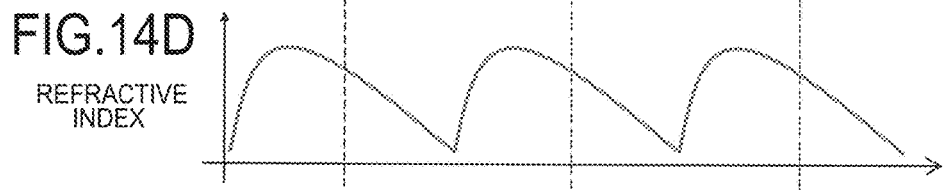
FIG.14D REFRACTIVE INDEX FIG.16A CROSS-SECTION VIEW
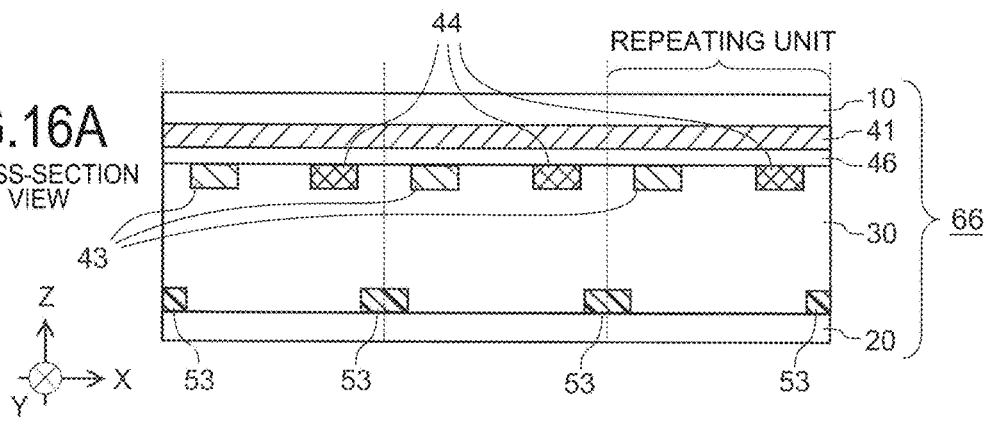
FIG.16B REFRACTIVE INDEX
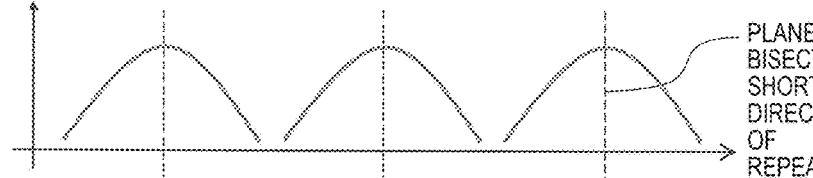
FIG.16C REFRACTIVE INDEX
FIG.16D REFRACTIVE INDEX
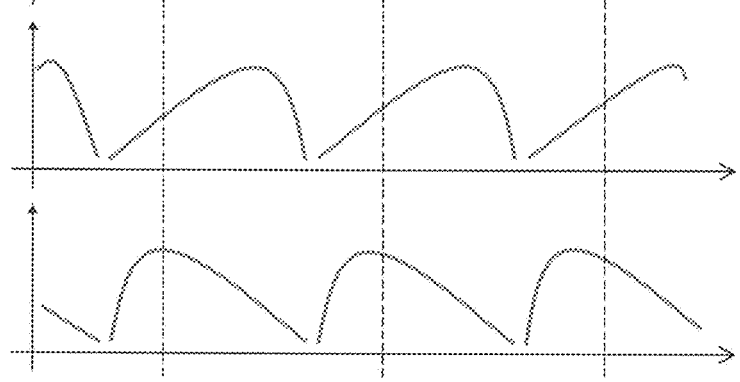

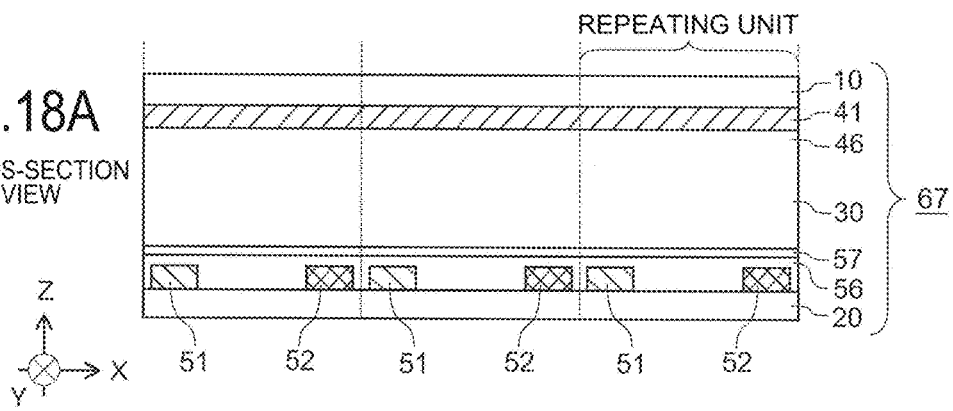
FIG.18A CROSS-SECTION VIEW
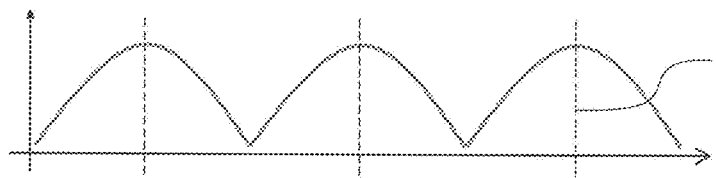
FIG.18B REFRACTIVE INDEX
PLANE THAT BISECTS SHORT DIRECTION OF REPEATING UNIT
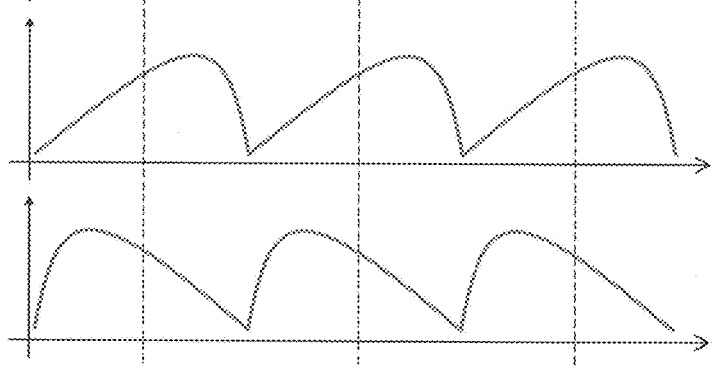
FIG.18C REFRACTIVE INDEX
FIG.18D REFRACTIVE INDEX

CROSS-SECTION VIEW

REFRACTIVE INDEX

REFRACTIVE INDEX

REFRACTIVE INDEX ated image in accordance with that position. For example,
LIQUID CRYSTAL LENTICULAR LENS ELEMENT, DRIVING METHOD THEREFOR, STEREOSCOPIC DISPLAY DEVICE, AND TERMINAL DEVICE

CROSS REFERENCE TO RELATED APPLICATIONS

This application is a National Stage of International Application No. PCT/JP2015/053911 filed Feb. 13, 2015, claiming priority based on Japanese Patent Application No. 2014-026478 filed Feb. 14, 2014, the contents of all of which are incorporated herein by reference in their entirety.

TECHNICAL FIELD

The present invention relates to a liquid crystal lenticular lens element, a stereoscopic display device having the liquid crystal lenticular lens element, a terminal device to which the stereoscopic display device is loaded, and a driving method of the liquid crystal lenticular lens element.

BACKGROUND ART

Currently, there is a great development in display devices capable of providing stereoscopic display. Such stereoscopic display devices are roughly classified into a type that requires the use of eyeglasses and a type used with naked eyes. Especially, the type capable of being used with naked eyes requires no trouble of wearing eyeglasses and is expected to be used broadly in the future.

As the stereoscopic display device employing a system that makes it possible to achieve stereoscopic display with naked eyes, there are the types having a light-ray distribution unit such as a lenticular lens or a parallax barrier placed on a front face or a back face of a display panel.

In a case of two-eye type of such system, employed is a structure with which right-eye pixels and left-eye pixels are prepared within the display panel, respectively, so that a video displayed on the eight-eye pixels reaches the right eye of a viewer via the lenticular lens or the parallax barrier while a video displayed on the left-eye pixels reaches the left eye.

In a case of a multi-eye type (n-viewpoints) that is expansion of the above-described two-eye type, pixels for the n-viewpoints are prepared in the display panel, and videos for two viewpoints among the n-viewpoints reach the left and right eyes of the viewer, respectively, The light-ray distribution unit such as the lenticular lens or the parallax barrier of those naked-eye type stereopsis systems is often bonded while the mutual positioning relation thereof with respect to the display panel is fixed. Thus, the region (hereinafter, referred to as a stereopsis region) where the images to be displayed are perceived as stereoscopic by the viewer is fixed to be in a specific range.

In a case where the viewer shifts the position under such circumstance, the viewing position thereof changes as well. Thus, the positions of the eyes of the viewer may become out of the stereopsis region and flat views are to be viewed or there may be generated a phenomenon of inverted visions where a left-eye image makes incident on the right eye and a right-eye image makes incident on the left eye. Under a state of such inverted vision, the viewer cannot acquire proper stereopsis, e.g., the viewer perceives originally popup videos to be drawn back, which causes the viewer to feel a sense of discomfort and fatigue.

Therefore, there is developed a viewpoint following system employing a technique which detects the position of the head part of the viewer and displays a stereoscopic reproduced image in accordance with that position. For example, technical content as shown in following Patent Documents 1 to 3 are known.

Patent Document 1 discloses the content of a technique which detects positions of each of both eyes of a viewer, switches display pixels for displaying a right-eye image and a left-eye image in accordance with signals generated based on the detection result, and expands a stereopsis region thereby.

Patent Document 2 discloses a light directivity control method which detects viewpoints of a viewer and physically drives a lenticular lens in accordance with the detection result so as to enable display videos to follow the viewpoints of the viewer.

Meanwhile, the three-dimensional display device disclosed in Patent Document 3 employs a system with which a liquid crystal lenticular lens constituted with a liquid crystal lens is disposed on the whole plane of a display panel and a refractive index distribution of the liquid crystal lenticular lens is changed in accordance with the position of a viewer so as to reproduce a stereoscopic image at a significant position for the viewer.

Now, the structural content of the three-dimensional display device of Patent Document 3 will be described in a more specific manner by referring to FIG. 23 and FIG. 24.

As shown in FIG. 23, this three-dimensional display device 100 includes a liquid crystal panel 101, an optical characteristic variable lens 102, a head-part detection unit 103, and an optical characteristic variable lens control unit 104. When the head part of the viewer moves, this structure achieves processing in which the head-part detection unit 103 upon detecting the move transmits positional information of the head part to the optical characteristic variable lens control unit 104, and the optical characteristic variable lens control unit 104 changes the drive so as to change the characteristic of the optical characteristic variable lens 102 based on the positional information.

As shown in FIG. 24 that is a cross-section view illustrating the details of the structure of the optical characteristic variable lens 102, the optical characteristic variable lens 102 includes: a liquid crystal 105; a glass substrate 108 on which an electrode array 106 with strip-type electrodes 106a, 106b, 106c, - - - , 106h arranged thereon is formed; and a glass substrate 109 with an electrode 107 formed on the plane thereof. Further, as shown in FIG. 24, the electrode array 106 and the electrode 107 are disposed to oppose to each other, and the liquid crystal 105 is filled between the gap formed therebetween.

By employing such structure, it becomes possible to electrically control the optical characteristic of the lens since the distribution shape of the refractive index of the aggregate of liquid crystal molecules, the entire level of the refractive index, and the pitch of the refractive index distribution repeated periodically can be controlled through changing the pattern of the voltage to be applied to the electrode array 106.

Patent Document 1: Japanese Patent No. 2662252
Patent Document 2: Japanese Unexamined Patent Publication Hei 2-44995
Patent Document 3: Japanese Patent No. 2920051

However, with the system where the right-eye image and the left-eye image are switched in accordance with the detection result of the positions of the both eyes of the viewer like the technique of Patent Document 1, there are such inconveniences that the observed views may become discontinuous or that stereopsis cannot be achieved at the location where the positions of the eyes of a viewer is switched.

Further, with the system disclosed in Patent Document 2 where the lenticular lens is physically driven, the relative positions of the display panel and the lenticular lens are required to be controlled extremely accurately. Thus, it is required to use a precision mechanical system, which generates issues of increasing the size of the device and the weight thereof. Furthermore, it is required in this case to move a relatively large lenticular lens, so that the responsiveness of position control in the display space becomes poor. In addition, since employed is the structure where the lenticular lens is moved only within a plane that is in parallel to the display panel, the range following the head part becomes also limited to the plane that is in parallel to the display.

Further, with the system employed in the three-dimensional display device of Patent Document 3, the number of wirings for corresponding to the electrodes 106a, 106b, 106c, - - - , 106h is required in order to set the voltage individually for each of the electrodes 106a, 106b, 106c, - - - , 106h. Therefore, it is required to connect a great number of signal supply wirings, so that manufacture of the optical characteristic variable lens becomes complicated. Further, with the technique employed herein, the minimum unit when making adjustment according to the move of the viewer depends on the wiring pitch, so that the adjustment becomes discontinuous.

The present invention is designed in view of the foregoing issues. Especially, it is the object of the present invention to provide a light-weight lenticular lens element for displaying proper stereoscopic images smoothly according to the position fluctuation of the viewer with a simple structure, a stereoscopic display device having the liquid crystal lenticular lens element, a terminal device having the stereoscopic display device loaded thereon, and a driving method thereof.

DISCLOSURE OF THE INVENTION

In order to achieve the foregoing object, the liquid crystal lenticular lens element according to the present invention employs a configuration which includes: a first substrate; a second substrate in parallel thereto; a liquid crystal layer provided between both substrates; a first electrode formed on the liquid crystal layer side of the first substrate; and second electrodes including a plurality of stripe-shaped electrodes formed on the liquid crystal layer side of the second substrate, wherein: a stripe-shaped repeating structure including repeating units placed along an arrangement direction of the second electrodes is formed; and an asymmetric refractive index distribution with respect to a plane bisecting each of the repeating units to another direction that is perpendicular to the arrangement direction is induced by an electric signal applied to each of the electrodes from outside.

Further, the stereoscopic display device according to the present invention employs a configuration which includes: a video display unit which emits light regarding parallax images; a directivity/direction control element which is capable of controlling directions of light emitted from the video display unit by an electric signal applied from outside; a detection unit which detects spatial position of a head part of a viewer; and a control unit which controls actions of the directivity/direction control element based on information regarding the spatial position outputted from the detection unit, wherein: the liquid crystal lenticular lens element is mounted as the directivity/direction control element; and the control unit generates the electric signal corresponding to the information of the spatial position and applies the signal to each electrode provided to the liquid crystal lenticular lens element.

Furthermore, the terminal device according to the present invention employs a configuration which includes: the stereoscopic display device of the present invention, and an operation unit which receives an instruction from a user and outputs an instruction signal based on the instruction to the stereoscopic display device.

Moreover, the liquid crystal lenticular lens element driving method according to the present invention is a method for driving the liquid crystal lenticular lens element of the stereoscopic display device which includes: the liquid crystal lenticular lens element including a first substrate, a second substrate in parallel thereto, a liquid crystal layer provided between both substrates, a first electrode formed on the liquid crystal layer side of the first substrate, second electrodes including a plurality of stripe-shaped electrodes formed on the liquid crystal layer side of the second substrate, and a stripe-shaped repeating structure formed with repeating units placed along an arrangement direction of the second electrodes; a detection unit which detects spatial position of a head part of a viewer; and a control unit which generates and outputs the electric signal based on information regarding the spatial position outputted from the detection unit, wherein: the detection unit acquires the positional information of the head part of the viewer; the detection unit generates the signal based on the positional information and outputs it toward the control unit; and when the signal inputted from the detection unit shows that the viewer is located in an oblique direction from the stereoscopic display device, the control unit applies a voltage signal set in advance to the plurality of stripe-shaped electrodes to induce an asymmetric refractive index distribution with respect to a plane bisecting each of the repeating units in other direction that is perpendicular to the arrangement direction.

With the present invention, it is possible to provide especially a light-weight liquid crystal lenticular lens element for displaying proper stereoscopic images smoothly according to the position fluctuation of the viewer with a simple structure, a stereoscopic display device having the liquid crystal lenticular lens element, a terminal device having the stereoscopic display device loaded thereon, and a driving method thereof.

BRIEF DESCRIPTION OF THE DRAWINGS

FIG. 2 is a block diagram showing the structure of a stereoscopic display device which includes the liquid crystal lenticular lens element disclosed in FIG. 1;

FIGS. 3A-3C show explanatory charts regarding actions when the liquid crystal lenticular lens element disclosed in FIG. 1 and FIG. 2 refracts a light ray from a video display unit symmetrically with respect to a normal direction of each substrate, in which FIG. 3A shows a cross-section view taken along A-A line of FIG. 1, FIG. 3B shows a graph regarding the potential distribution, and FIG. 3C shows a graph regarding the refractive index distribution, respectively;

FIGS. 4A-4C show explanatory charts regarding actions when the liquid crystal lenticular lens element disclosed in FIG. 1 and FIG. 2 emits a light ray from a video display unit by tilting it in a right direction with respect to a normal direction of each substrate, in which FIG. 4A shows a cross-section view taken along A-A line of FIG. 1, FIG. 4B shows a graph regarding the potential distribution, and FIG. 4C shows a graph regarding the refractive index distribution, respectively;

FIGS. 5A-5C show explanatory charts regarding actions when the liquid crystal lenticular lens element disclosed in FIG. 1 and FIG. 2 emits a light ray from a video display unit by tilting it in a left direction with respect to a normal direction of each substrate, in which FIG. 5A shows a cross-section view taken along A-A line of FIG. 1, FIG. 5B shows a graph regarding the potential distribution, and FIG. 5C shows a graph regarding the refractive index distribution, respectively;

FIG. 6 is a cross-section view showing an alignment direction of the liquid crystal in the liquid crystal lenticular lens element disclosed in FIG. 1;

FIGS. 7A and 7B show explanatory charts of a case where an equivalent voltage of equal to or larger than the threshold voltage of the liquid crystal is applied to each stripe-shaped electrode in the liquid crystal lenticular lens element disclosed in FIG. 1, in which FIG. 7A is a cross-section view showing a liquid crystal alignment state (liquid crystal alignment action) and FIG. 7B is a graph showing the refractive index distribution;

FIGS. 8A and 8B show explanatory charts of a case where the amplitude of the applied voltage of the stripe-shaped electrode on the negative side of the X-axis in a repeating unit is adjusted to be larger than the amplitude of the applied voltage of the stripe-shaped electrode on the positive side of the same X-axis in the liquid crystal lenticular lens element disclosed in FIG. 1, in which FIG. 8A is a cross-section view showing a liquid crystal alignment state (liquid crystal alignment action) and FIG. 8B is a graph showing the refractive index distribution;

FIGS. 9A and 9B show explanatory charts of a case where the amplitude of the applied voltage of the stripe-shaped electrode on the negative side of the X-axis in a repeating unit is adjusted to be smaller than the amplitude of the applied voltage of the stripe-shaped electrode on the positive side of the same X-axis in the liquid crystal lenticular lens element disclosed in FIG. 1, in which FIG. 9A is a cross-section view showing a liquid crystal alignment state (liquid crystal alignment action) and FIG. 9B is a graph showing the refractive index distribution;

FIGS. 14A-14D show explanatory charts regarding the refractive index distribution induced by the liquid crystal lenticular lens element disclosed in FIG. 13, in which FIG. 14A is a cross-section view (cross-section view of XZ plane) taken along B-B line of FIG. 13, FIG. 14B is a graph showing the refractive index distribution of a case where an equivalent voltage of equal to or larger than the threshold value of the liquid crystal is applied to each stripe-shaped electrode as the second electrode, FIG. 14C is a graph showing the refractive index distribution of a case where the applied voltage of each stripe-shaped electrode as the second electrode is adjusted to be smaller on the positive side of the X-axis than in the negative side of the same X-axis within the repeating unit, and FIG. 14D is a graph showing the refractive index distribution of a case where the applied voltage of each stripe-shaped electrode as the second electrode is adjusted to be larger on the positive side of the X-axis than in the negative side of the same X-axis within the repeating unit;

FIGS. 16A-16D show explanatory charts regarding the refractive index distribution induced by the liquid crystal lenticular lens element disclosed in FIG. 15, in which FIG. 16A is a cross-section view (cross-section view of XZ plane) taken along C-C line of FIG. 15, FIG. 16B is a graph showing the refractive index distribution of a case where an equivalent voltage of equal to or larger than the threshold value of the liquid crystal is applied to each stripe-shaped electrode as the first electrode, FIG. 16C is a graph showing the refractive index distribution of a case where the applied voltage of each stripe-shaped electrode as the first electrode is adjusted to be smaller on the positive side of the X-axis than in the negative side of the same X-axis within the repeating unit, and FIG. 16D is a graph showing the refractive index distribution of a case where the applied voltage of each stripe-shaped electrode as the first electrode is adjusted to be larger on the positive side of the X-axis than in the negative side of the same X-axis within the repeating unit;

FIGS. 18A-18D show explanatory charts regarding the refractive index distribution induced by the liquid crystal lenticular lens element disclosed in FIG. 17, in which FIG. 18A is a cross-section view (cross-section view of XZ plane) taken along D-D line of FIG. 17, FIG. 18B is a graph showing the refractive index distribution of a case where an equivalent voltage of equal to or larger than the threshold value of the liquid crystal is applied to each stripe-shaped electrode, FIG. 18C is a graph showing the refractive index distribution of a case where the applied voltage of each stripe-shaped electrode is adjusted to be smaller on the positive side of the X-axis than in the negative side of the same X-axis within the repeating unit, and FIG. 18D is a graph showing the refractive index distribution of a case where the applied voltage of each stripe-shaped electrode is adjusted to be larger on the positive side of the X-axis than in the negative side of the same X-axis within the repeating unit;

FIGS. 20A-20D show explanatory charts regarding the refractive index distribution induced by the liquid crystal lenticular lens element disclosed in FIG. 19, in which FIG. 20A is a cross-section view (cross-section view of XZ plane) taken along E-E line of FIG. 19, FIG. 20B is a graph showing the refractive index distribution of a case where an equivalent voltage of equal to or larger than the threshold value of the liquid crystal is applied to each stripe-shaped electrode as the second electrode, FIG. 20C is a graph showing the refractive index distribution of a case where the applied voltage of each stripe-shaped electrode as the second electrode is adjusted to be smaller on the positive side of the X-axis than in the negative side of the same X-axis within the repeating unit, and FIG. 20D is a graph showing the refractive index distribution of a case where the applied voltage of each stripe-shaped electrode as the second electrode is adjusted to be larger on the positive side of the X-axis than in the negative side of the same X-axis within the repeating unit;

BEST MODES FOR CARRYING OUT THE INVENTION

First Embodiment

A first embodiment of a liquid crystal lenticular lens according to the present invention and a stereoscopic display device having the same will be described by referring to FIG. 1 to FIG. 9.
(Overall Structure)

Figure 1:
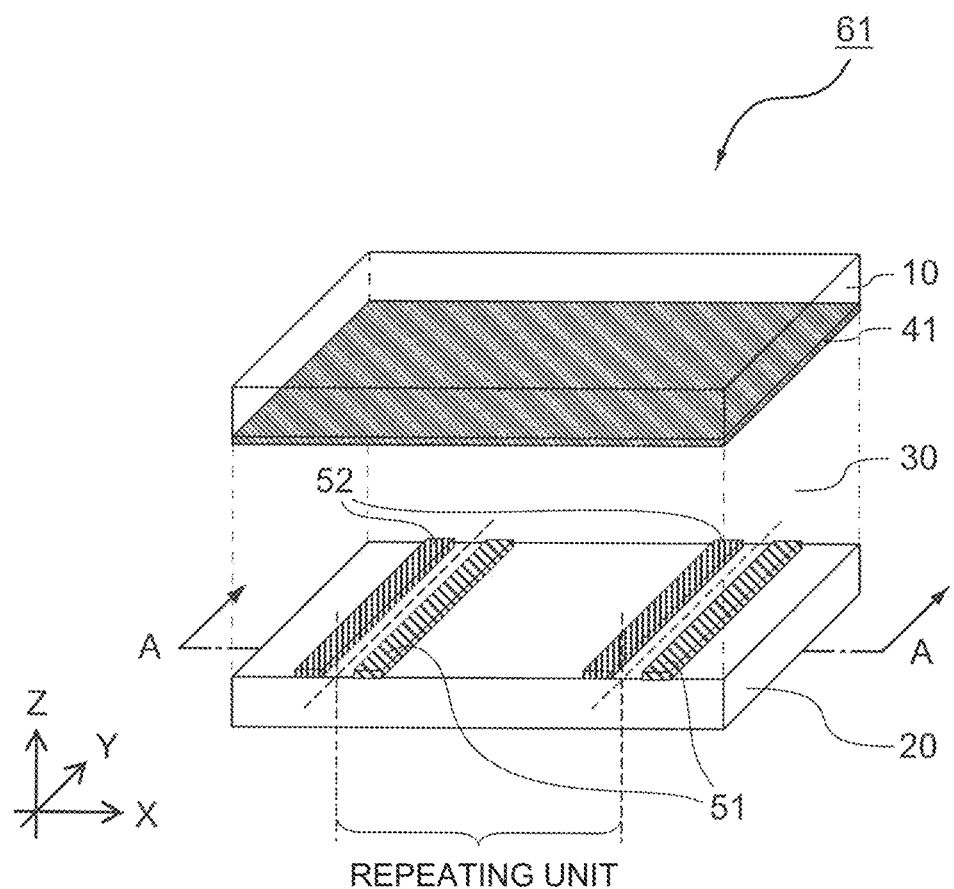
FIG. 1 is a perspective view showing the structure of a liquid crystal lenticular lens element according to a first embodiment of the present invention.

As shown in FIG. 1, a liquid crystal lenticular lens element 61 includes: a first substrate 10 as a glass substrate; a second substrate 20 as a glass substrate that is in parallel thereto; a liquid crystal layer 30 provided between both of the substrates; a surface electrode 41 as a first electrode formed on the liquid crystal layer 30 side of the first substrate 10; and stripe-shaped electrodes 51 and 52 as second electrodes formed on the liquid crystal layer 30 side of the second substrate 20.

Assuming herein that the X direction shown in FIG. 1 is the arrangement direction of the second electrode and the Y direction of the same is the other direction that is perpendicular to the arrangement direction, the liquid crystal lenticular lens element 61 is in a structure in which a stripe-shaped repeating structure constituted with repeating units along the arrangement direction (X direction) of the second electrode and also employs a feature structure in which asymmetric refractive index distributions are induced regarding a plane that bisects each of the repetition units regarding the other direction (Y direction) that is at a right angle with respect to the arrangement direction by an electric signal applied from outside to either one or both of the first electrode and the second electrode.

Each of the stripe-shaped electrodes 51 and each of the stripe-shaped electrodes 52 are in parallel to each other, and each of those can apply the voltage individually.

Further, the stripe-shaped electrode 51 and the stripe-shaped electrode 52 are disposed alternately with two kinds of predetermined distances provided therebetween. In the first embodiment, such regular arrangement of the stripe-shaped electrodes 51 and 52 forms a stripe-shaped repeating structure along the arrangement direction (X direction) of the second electrodes in parallel to the both substrates (10 and 20) as described above.

In this repeating structure, a single unit (repeating unit) sectioned by including a single stripe-shaped electrode 51 and a single stripe-shaped electrode 52 neighboring thereto with a specific distance provided therebetween in the positive direction of the X-axis is repeatedly and continuously provided along the X direction.

Further, looking at the repeating unit, the X direction shown in FIG. 1 is also referred to as a short direction while the Y-axis direction of the same is referred to as a longitudinal direction. This is also the same in each of the embodiments to be described later.

As shown in FIG. 1, the stripe-shaped electrodes 51 and 52 on the second substrate 20 are in parallel in the longitudinal direction (Y direction) of the repeating unit. One (51 or 52) of the stripe-shaped electrodes is located on one end side of the short direction (X direction) of the repeating unit, and the other (51 or 52) of the stripe-shaped electrodes is located on the other end side of the short direction (X direction).

Now, an example of a manufacturing method of the liquid crystal lenticular lens element 61 shown in FIG. 1 will be described.

For example, glass substrates are used as the first substrate 10 and the second substrate 20, and a transparent conductive film such as ITO formed thereon by sputtering deposition is pattern-processed to form the surface electrode 41 and the stripe-shaped electrodes 51, 52.

Then, polyimide is applied on the first substrate 10 and the second substrate 20, rubbing processing is performed, and the both substrates are pasted via the liquid crystal layer 30 with typical liquid crystal element assembling steps.

The rubbing directions of the first substrate 10 and the second substrate 20 are set to as the Y direction that is in parallel to the stripe-shaped electrodes 51, 52, and also the rubbing directions of the both substrates are set to be antiparallel to each other (e.g., when the rubbing direction of the first substrate 10 is set as the positive direction of the Y-axis, the rubbing direction of the second substrate 20 is set as the negative direction of the Y-axis).

As described, through setting the rubbing directions as the Y direction, it is possible to suppress the influence of the pre-tilt angle for the rise of the liquid crystal when a voltage is applied to the electrodes, thereby making it possible to acquire a target phase difference distribution with fine precision.

In addition, the first embodiment employs nematic liquid crystal exhibiting positive refractive index anisotropy as the liquid crystal constituting the liquid crystal layer 30.

Next, the content of each structural element of the stereoscopic display device according to the first embodiment will be described by referring to FIG. 2.

A stereoscopic display device 90 which displays stereoscopic images toward the viewer includes: the liquid crystal lenticular lens element 61 as a directivity/direction control element capable of controlling the emitting direction of light by an electric signal applied from outside; a video display unit 70 which emits light regarding parallax images toward the liquid crystal lenticular lens element 61; a detection unit 80 which detects the spatial position of a head part of the viewer; and a control unit 81 which controls the liquid crystal lenticular lens element 61 so as to reproduce a stereoscopic image at an optimum position for the viewer.

The control unit 81 is structured to control the actions of the liquid crystal lenticular lens element 61 based on the information regarding the spatial position outputted from the detection unit 80. That is, the control unit 81 employs the structure which generates electric signals corresponding to the information of the spatial position and applies the signals to each electrode provided to the liquid crystal lenticular lens element 61.

The liquid crystal lenticular lens element 61 shown herein corresponds to a cross-section view taken along A-A line of FIG. 1. On the first substrate 10 and the second substrate 20 disposed opposing to each other with the liquid crystal layer 30 interposed therebetween, the surface electrode 41 and the stripe-shaped electrodes 51, 52 are formed, respectively.

Subsequently, operational effects of the liquid crystal lenticular lens element 61 of the first embodiment will be described by referring to FIG. 3 to FIG. 5. In each of those charts, shown are cross-section views taken along the A-A line (cross-section views of XZ plane) of FIG. 2 and graphs regarding the potential distributions formed by the voltages applied to each electrode and the refractive index distributions generated based thereupon.

Further, shown in FIG. 3 to FIG. 5 are the liquid crystal lenticular lens element 61 and the video display unit 70 out of the structural members of the stereoscopic display device 90.

In the liquid crystal lenticular lens element 61, the surface electrode 41 and the stripe-shaped electrodes 51, 52 formed on the first substrate 10 and the second substrate 20, respectively, are disposed to oppose to each other with the liquid crystal layer 30 interposed therebetween and, as described above, a stripe-shaped repeating structure in which the repeating units are continuously provided in the X direction is formed.

The liquid crystal lenticular lens element 61 forms the potential distributions as in each of the graphs shown in B of FIG. 3 to FIG. 5 through controlling, by the control unit 81, the voltage signals applied to the stripe-shaped electrodes 51 and the stripe-shaped electrodes 52 provided to the element itself.

Through aligning the liquid crystal along those potential distributions, the refractive index distributions as in each of the graphs shown in C of FIG. 3 to FIG. 5 are generated. Thereby, the liquid crystal lenticular lens element 61 achieves the function as the cylindrical lens that corresponds to the repeating unit.

Further, "plane that bisects transvers direction of repeating unit" shown in each of those charts corresponds to "plane that bisects repeating unit regarding other direction (Y direction) that is perpendicular to the arrangement direction" described above.

That is, as shown in FIG. 3 to FIG. 5, in a case where the short direction of the repeating unit is defined as the X direction, the longitudinal direction of the repeating unit orthogonal to the X direction is defined as the Y direction, and the direction orthogonal to the X direction and the Y direction is defined as the Z direction in the liquid crystal lenticular lens element 61 including the stripe-shaped repeating units, the "plane that bisects transvers direction of repeating unit" is a virtual plane which bisects the short direction of the repeating unit and is located within a YZ plane in parallel to the longitudinal direction of the repeating unit.

Hereinafter, the "plane that bisects transvers direction of repeating unit" is simply referred to as "unit bisecting plane".

Note that the virtual plane is located within the YZ plane as described above, so that it is illustrated as a straight line in the cross-section views (XZ plane) shown in FIG. 3 to FIG. 5.

FIG. 3A is a schematic chart showing the paths of light rays emitted from the video display unit 70 when the liquid crystal lenticular lens element 61 generates a symmetrical refractive index distribution regarding the unit bisecting plane.

In that case, the optical axis of the cylindrical lens formed with the refractive index distribution generated by the liquid crystal lenticular lens element 61 is structured to become in parallel to the unit bisecting plane as shown in FIG. 3C.

Therefore, under such circumstance, the light rays emitted from point A and point B on the video display unit 70 are refracted symmetrically with respect to the normal direction of the first substrate 10 and the second substrate 20 provided that the focal distance of the liquid crystal lenticular lens element 61 is adjusted. Thus, it is possible to distribute a right-eye image and a left-eye image to the right eye (R) and the left eye (L) of the observer (O), respectively.

In the meantime, FIG. 4A and FIG. 5A are schematic charts showing the paths of the light rays emitted from the video display unit 70 when the liquid crystal lenticular lens element 61 generates an asymmetrical refractive index distribution with respect to the unit bisecting plane.

As shown in FIG. 4C, in a case where the refractive index distribution of the liquid crystal lenticular lens element 61 shows a shape deflected on the right direction (positive direction of the X-axis) than the unit bisecting plane, the optical axis of the cylindrical lens formed by the refractive index distribution is tilted on the right side than the normal direction of the first substrate 10 and the second substrate 20. Therefore, the light rays emitted from the point A and the point B of the video display unit 70 are emitted by being tilted on the right side than the normal direction of the first substrate 10 and the second substrate 20.

Therefore, as in the above-described case, a right-eye image and a left-eye image can be properly distributed to the right eye (R) and the left eye (L) of the observer (O), respectively.

Further, as shown in FIG. 5C, in a case where the refractive index distribution of the liquid crystal lenticular lens element 61 shows a shape deflected in the left direction (negative direction of the X-axis) than the unit bisecting plane, the optical axis of the cylindrical lens formed by the refractive index distribution is tilted on the left side than the normal direction of the first substrate 10 and the second substrate 20. Therefore, the light rays emitted from the point A and the point B of the video display unit 70 are emitted by being tilted on the left side than the normal direction of the first substrate 10 and the second substrate 20.

Therefore, as in the above-described case, a right-eye image and a left-eye image can be properly distributed to the right eye (R) and the left eye (L) of the observer (O), respectively.

As described above, through controlling the liquid crystal lenticular lens element 61 to make a symmetric refractive index distribution with respect to the unit bisecting plane, parallel light emitted toward the front face direction can be generated. Meanwhile, through controlling the liquid crystal lenticular lens element 61 to make an asymmetric refractive index distribution with respect to the unit bisecting plane, parallel light emitted by being tilted in the left or right direction with respect to the unit bisecting plane can be generated.

Based on such operational effect, it becomes possible to adjust the position to display stereoscopic videos in accordance with the position of the observer (O) through effectively controlling the liquid crystal lenticular lens element 61 by the control unit 81 in accordance with the position of the observer (O) detected by the detection unit 80. Therefore, proper stereoscopic videos can be provided to the observer (O).

Note here that each of all the refractive index distributions shown in FIG. 3 to FIG. 5 corresponds to each repeating unit and has a periodic structure along the arrangement direction of the second electrodes.

Thus, the relation between the shortest length of the repeating structure (Pe: shortest length of the repeating structure of the electrode) based on the arrangement of the stripe-shaped electrode 51 and the stripe-shaped electrode 52 of the first embodiment and the length per period of the periodic structure regarding the refractive index distribution (Pn: length of the repeating period of the refractive index distribution) generated by applying significant voltages to each of those electrodes will be described by referring to FIG. 3 to FIG. 5.

As shown in FIG. 3 to FIG. 5, each of the electrodes (51, 52) on the second substrate 20 with the layout thereof forms the repletion structure with the shortest length Pe of the repeating structure in the X direction.

The refractive index distribution generated when a potential distribution symmetric regarding the plane that bisects the short direction of the repeating structure as in FIG. 3B has the repeating structure having Pn as the repeating period length in the X direction as shown in FIG. 3C.

The refractive index distributions generated when a asymmetric potential distribution with respect to the plane that bisects the short direction of the repeating structure as in FIG. 4B and FIG. 5B also have the repeating structure having Pn as the repeating period length in the X direction as shown in FIG. 3C.

Further, the first embodiment is designed in such a manner that the repeating unit (Pe) that is the shortest length of the repeating structure of the electrodes and the length (Pn) of the repeating period the refractive index distribution become equivalent (Pe=Pn) in any of the cases shown in FIG. 3 to FIG. 5 described above.

Through employing such structure into the liquid crystal lenticular lens element 61, the number of stripe-shaped electrodes 51 and 52 formed on the second substrate 20 can be suppressed to a necessary minimum number. This makes it possible to simplify the electrode wiring structure.

(Explanation of Actions)

Subsequently, actions of the liquid crystal lenticular lens element 61 according to the present invention will be described by referring to FIG. 6 to FIG. 9. In FIG. 6 and FIG. 7A to FIG. 9A, shown are cross-section views (cross-section views of XZ plane) taken along A-A line of FIG. 1. At the same time, graphs of the refractive index distributions generated by voltages applied to each electrode are shown in FIG. 7B to FIG. 9B.

FIG. 6 shows an initial liquid crystal alignment state when no voltage is applied. The liquid crystals (liquid crystal molecules) are almost in a parallel alignment state with respect to each of the substrates (10 and 20) while having pre-tilt angles (not shown).

In the meantime, shown in FIG. 7A to FIG. 9A are liquid crystal alignment states when a voltage of equal to or larger than the threshold voltage of the liquid crystal is applied to each of the stripe-shaped electrodes. When a voltage is applied to the surface electrode 41 and the two stripe-shaped electrodes 51, 52, the liquid crystal is aligned to be perpendicular to the substrates, thereby generating a potential gradient in the X direction. Herein, shown is a case where applied voltage to the surface electrode 41 is set as 0V as a way of example.

In a case where an equivalent voltage of equal to or larger than the threshold voltage of the liquid crystal is applied to the two stripe-shaped electrodes 51 and 52, acquired is the refractive index distribution as in FIG. 7B.

When the amplitude of the voltage applied to the stripe-shaped electrode 51 is adjusted to be larger than the amplitude of the voltage applied to the stripe-shaped electrode 52, acquired is the refractive index distribution as in FIG. 8B.

Figures 9A, 9B:
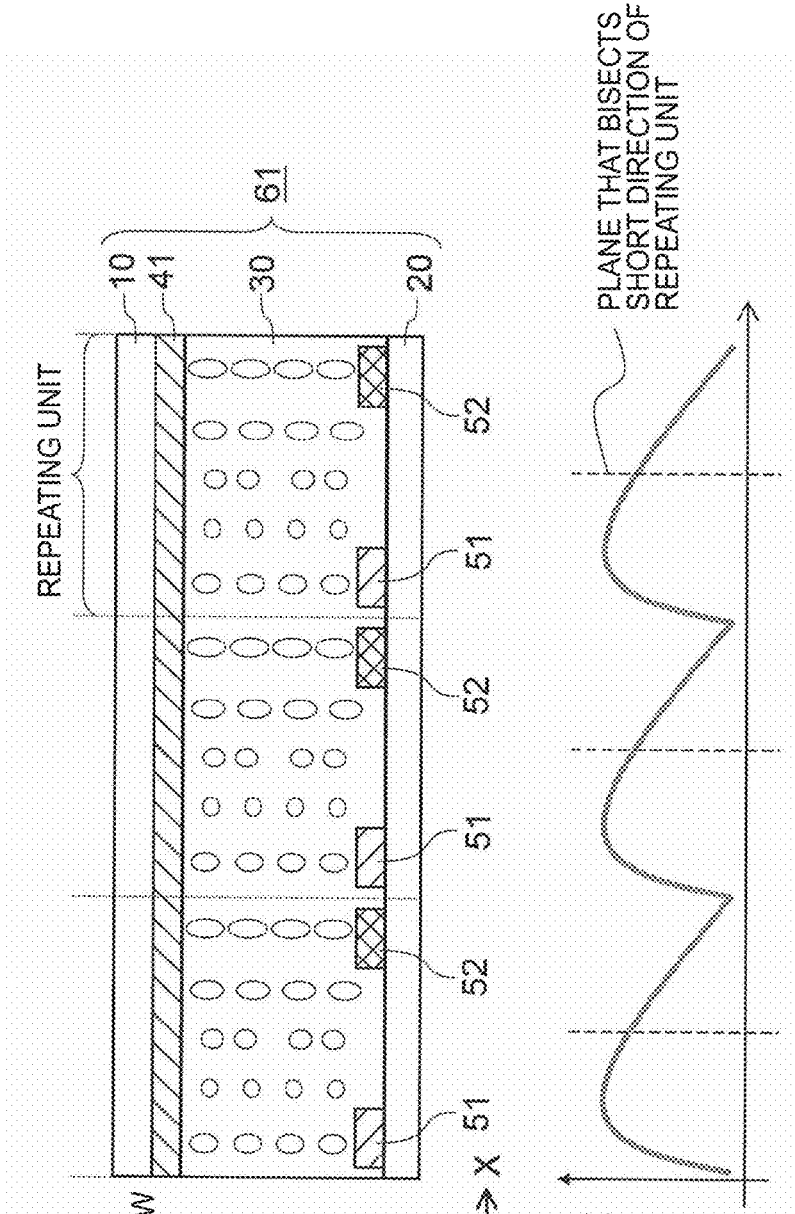

When the amplitude of the voltage applied to the stripe-shaped electrode 51 is adjusted to be smaller than the amplitude of the voltage applied to the stripe-shaped electrode 52, acquired is the refractive index distribution as in FIG. 9B.

That is, the liquid crystals (liquid crystal molecules) are aligned according to the potential distribution formed when the voltage is applied to the surface electrode 41 and the two stripe-shaped electrodes 51, 52, and the refractive index distributions as shown in FIG. 7B to FIG. 9B are generated for the polarized light of the Y direction. Thereby, the liquid crystal lenticular lens element 61 exhibits the function as the cylindrical lens corresponding to the repeating unit.

Therefore, when a symmetric refractive index distribution with respect to the unit bisecting plane based on the electrodes constituting the liquid crystal lenticular lens element 61 is formed as in FIG. 7, the light rays emitted from the video display unit are emitted laterally symmetrically with respect to the normal direction of the first substrate 10 and the second substrate 20 as shown in FIG. 3A.

In the meantime, when an asymmetric refractive index distribution with respect to the unit bisecting plane is formed as in FIG. 8 or FIG. 9, the light rays emitted from the video display unit are emitted by being tilted in the right or the left direction with respect to the normal direction of the first substrate 10 and the second substrate 20 as shown in FIG. 4A or FIG. 5A.

(Effects and the Like of First Embodiment)

As described above, the liquid crystal lenticular lens element 61 according to the first embodiment is capable of controlling the light emitting direction to arbitrary directions by electric signals adjusted and applied from outside to the second electrodes constituted with a plurality of stripe-shaped electrodes on the second substrate 20 in particular. This makes it possible to display significant images so that the viewer can recognize the stereoscopic images suited for the observing position.

That is, through employing the structure with which the control unit 81 controls the light emitting direction of the liquid crystal lenticular lens element 61 shown in FIG. 1 and the like to be adjusted to the positions of the both eyes of the viewer detected by the detection unit 80, the stereoscopic images displayed on the video display unit 70 in an optimum state can be recognized even when the viewer shifts the position.

Further, the first embodiment employs the structure with which: the two stripe-shaped electrodes 51 and 52 capable of individually setting the potentials are provided within each repeating unit; the stripe-shaped electrode 52 and the stripe-shaped electrode 51 are disposed to be neighboring to each other in the vicinity of the border section of each of the repeating units (over the border line of each of the repeating units); and the control unit 81 controls the refractive index distribution by adjusting the voltage signals to be applied to those electrodes. Thereby, it is possible to perform optimization of stereopsis display by following the position of the viewer with a small number of electrodes and also possible to avoid complication of wirings.

That is, as described above, the use of the simple-structured and light-weight liquid crystal lenticular lens element 61 and stereoscopic display device 90 of the first embodiment makes it possible to display proper stereoscopic videos in accordance with the positions of the viewer smoothly even when the viewer changes the sighting position.

While an example of the case of employing the stripe-shaped electrodes as the second electrodes has been described herein, the structure of the electrode is not limited only to such case.

Second Embodiment

A second embodiment of the liquid crystal lenticular lens element according to the present invention will be described by referring to FIG. 10.

Figure 10:
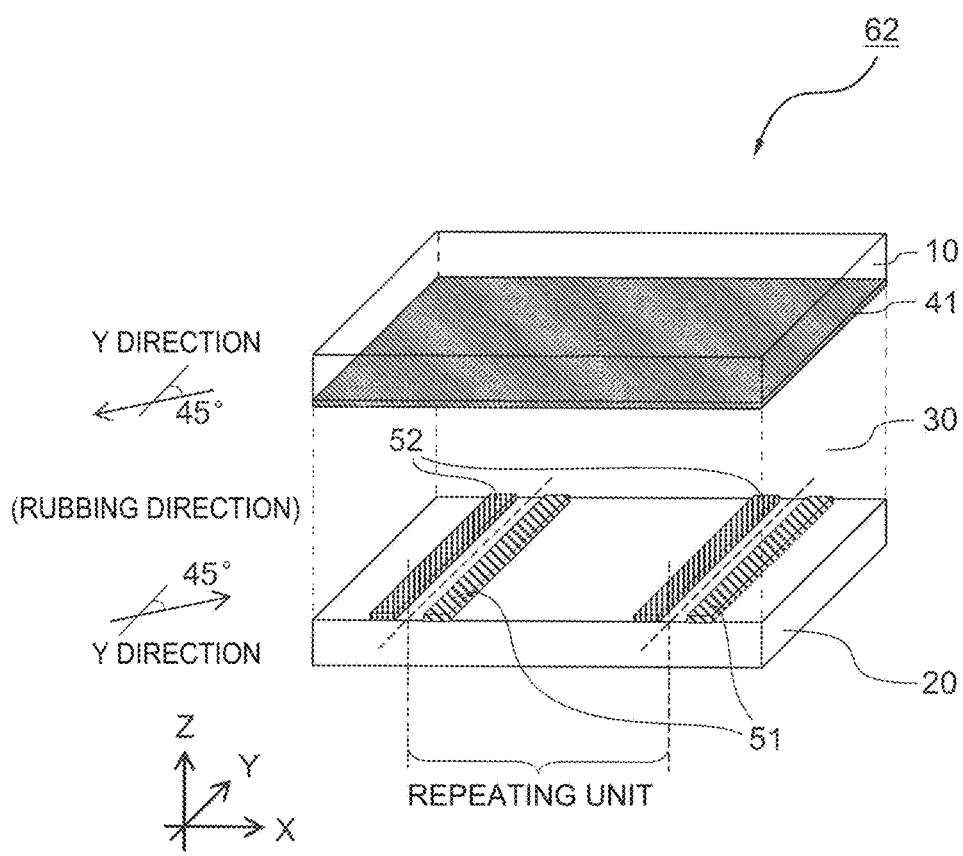
FIG. 10 is a perspective view showing the structure of a liquid crystal lenticular lens element according to a second embodiment of the present invention.

As shown in FIG. 10, the same electrode structure and the like of the liquid crystal lenticular lens element 61 of the first embodiment described above are employed to a liquid crystal lenticular lens element 62 of the second embodiment. However, the initial liquid crystal alignment direction is different, so that the different point will be described herein.

Further, same reference numerals are used for the equivalent structural members as those of the first embodiment described above, and explanations thereof are omitted.

The liquid crystal lenticular lens element 62 can be manufactured through the same steps as those of the liquid crystal lenticular lens element 61 of the first embodiment described above.

However, the rubbing directions of the first substrate 10 and the second substrate 20 regarding the initial liquid crystal alignment direction are defined to be the directions tilted at 45° with respect to the Y direction that is in parallel to the stripe-shaped electrodes 51 and 52 and also the rubbing directions of the both substrates are set to be antiparallel to each other (see arrows shown in FIG. 10).

The second embodiment employs a TN-type liquid crystal element as the video display unit to be combined with the liquid crystal lenticular lens element 62 fabricated by each of the steps including the rubbing processing.

In order to acquire a wide viewing angle performance in the lateral direction of the screen in a case of the TN-type liquid crystal element, it is necessary to tilt the rubbing directions at 45° with respect to the lateral direction of the screen. The polarized light emitted from the rubbing-processed video display unit is emitted to the directions tilted at 45° with respect to the lateral direction of the screen.

Therefore, the initial alignment direction of the liquid crystal lenticular lens element is required to be consistent with that. Thus, as shown in FIG. 10, the rubbing directions of the liquid crystal lenticular lens element 62 are designed to be the directions tilted at 45° with respect to the Y direction.

Note here that the liquid crystal lenticular lens element 62 of the second embodiment may also be employed as the structural member of the stereoscopic display device 90 shown in FIG. 2 instead of the liquid crystal lenticular lens element 61.

(Effects and the Like of Second Embodiment)

The second embodiment employs the rubbing processing regarding adjustment of the initial liquid crystal alignment direction as described above in order to be suited for the video display unit constituted with the TN-type liquid crystal element. Thereby, loss of the light amount emitted from the display can be prevented, so that deterioration in the luminance can be prevented.

Other structures and actions are the same as those shown in the first embodiment described above, and other operational effects to be generated are also the same.

Third Embodiment

A third embodiment of the liquid crystal lenticular lens element according to the present invention will be described by referring to FIG. 11.

Figure 11:
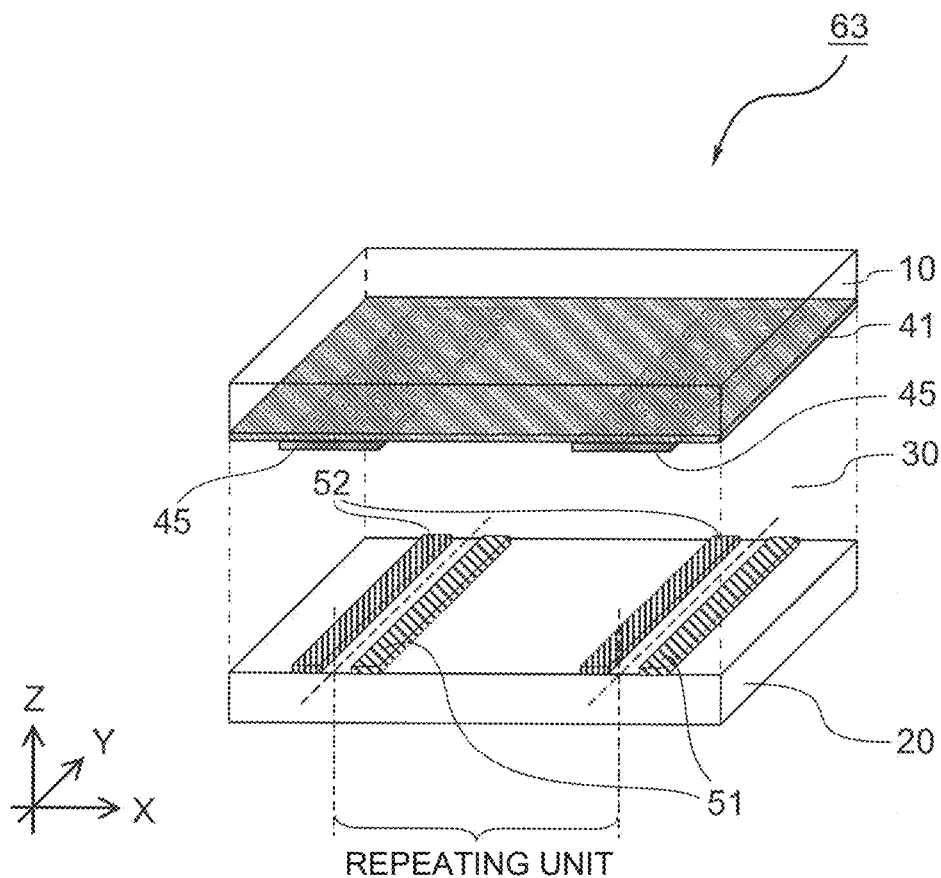
FIG. 11 is a perspective view showing the structure of a liquid crystal lenticular lens element according to a third embodiment of the present invention.

As shown in FIG. 11, a liquid crystal lenticular lens element 63 according to the third embodiment is different from the liquid crystal lenticular lens elements employed in the first and second embodiments described above in respect that black matrixes 45 for shielding light are provided on the first substrate 10. Thus, particularly the structure regarding the black matrix 45 will be described herein. Further, same reference numerals are used for the equivalent structural members as those of each of the embodiments described above, and explanations thereof are omitted.

As shown in FIG. 11, the black matrixes 45 on the first substrate 10 are provided in such a manner that the centers thereof in the X direction come to match the border lines of the repeating units. That is, each of the black matrixes 45 is provided, via the liquid crystal layer 30, at a position opposing to the two stripe-shaped electrodes (52 and 51) that are disposed in the vicinity of the border sections of the repeating units.

Now, an example of a fabricating method of the liquid crystal lenticular lens element 63 shown in FIG. 11 will be described.

For example, a glass substrate is used as the first substrate 10 and a transparent conductive film such as ITO formed thereon by sputtering deposition is pattern-processed to form the surface electrode 41. Thereafter, the third embodiment employs a structure with which a thin film of chrome, for example, is formed by sputtering deposition, and pattern-processing is applied to form the black matrixes 45.

The structure of the electrodes in the liquid crystal lenticular lens element 63 is the same as those of the liquid crystal lenticular lens elements used in the first and second embodiments, and other manufacturing steps are also the same as the case of the first embodiment described above.

Further, as the structural member of the stereoscopic display device 90 shown in FIG. 2, the liquid crystal lenticular lens element 63 of the third embodiment may also be employed instead of the liquid crystal lenticular lens element 61.

(Effects and the Like of Third Embodiment)

The liquid crystal lenticular lens element 63 of the third embodiment employs the structure with which the black matrixes 45 for shielding light are provided at positions that are the border sections of each of the repeating units and at positions opposing to the two stripe-shaped electrodes (52 and 51) located in the vicinity of the border sections on the first substrate 10. That is, the black matrixes 45 for shielding the light leaked from the region where the function of shuttering the light of the liquid crystal is insufficient are provided on the first substrate 10, so that light leakage caused due to disturbance in the liquid crystal alignment in the end parts of the repeating units can be prevented.

With the structure shown in FIG. 11 in particular, the electric field between the stripe-shaped electrodes 51 and 52 becomes extremely strong. Therefore, there may be generated inconveniences such as an increase in the aberration in the lens end part and generation of light leakage due to the alignment.

In view of such point, the black matrixes 45 exhibiting the light-shielding characteristic are employed in the liquid crystal lenticular lens element 63. Therefore, the increase in the aberration in the lens end part and generation of light leakage due to the alignment can be suppressed effectively.

Other structures and actions are the same as those shown in the first embodiment described above, and other operational effects to be generated are also the same.

Fourth Embodiment

A fourth embodiment of the liquid crystal lenticular lens element according to the present invention will be described by referring to FIG. 12.

Figure 12:
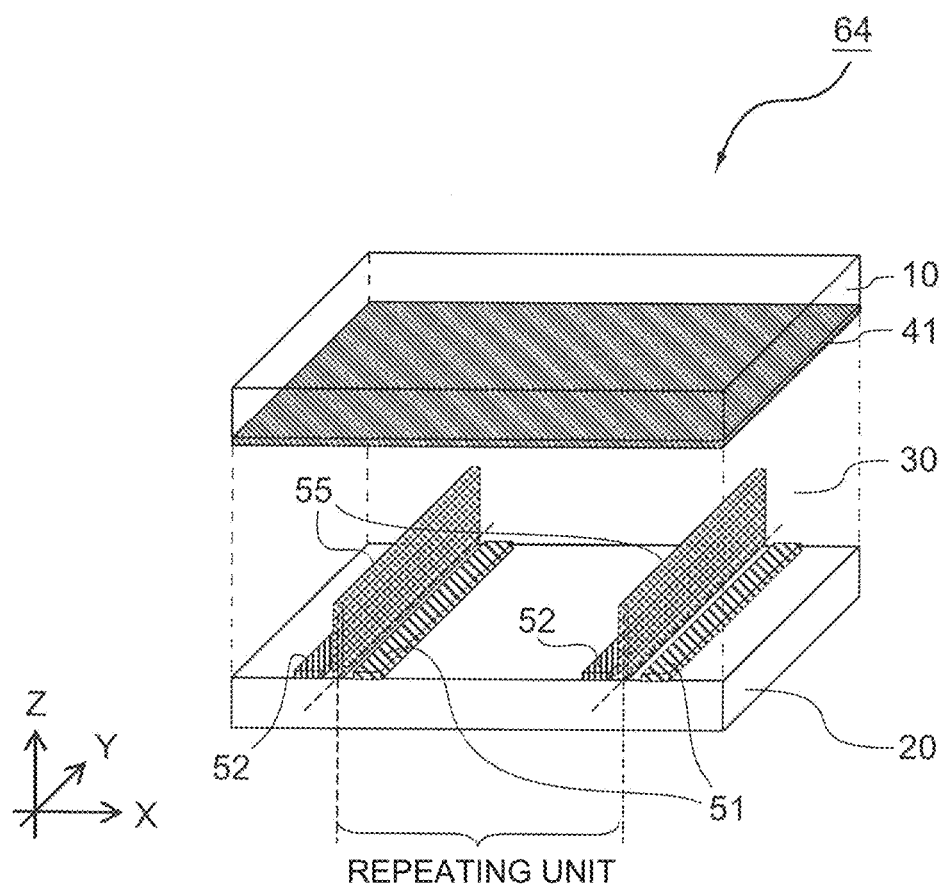
FIG. 12 is a perspective view showing the structure of a liquid crystal lenticular lens element according to a fourth embodiment of the present invention.

As shown in FIG. 12, a liquid crystal lenticular lens element 64 according to the fourth embodiment is different from the first embodiment described above in respect that spacers 55 are provided on the second substrate 20. Thus, particularly the structure regarding the spacer 55 will be described herein. Further, same reference numerals are used for the equivalent structural members as those of each of the embodiments described above, and explanations thereof are omitted.

As shown in FIG. 12, the center of the spacer 55 in the thickness direction (X direction) comes to match the border line of the repeating unit. That is, the spacer 55 is disposed between the two stripe-shaped electrodes (52 and 51) disposed in the vicinity of the border sections of the repeating units on the second substrate 20.

Now, an example of a fabricating method of the liquid crystal lenticular lens element 64 shown in FIG. 12 will be described.

For example, glass substrates are used as the first substrate 10 and the second substrate 20, and a transparent conductive film such as ITO formed thereon by sputtering deposition is pattern-processed to form the surface electrode 41 and the stripe-shaped electrodes 51, 52. Thereafter, the fourth embodiment employs a structure with which the spacers 55 are formed on the second substrate 20 by using a photo-spacer fabricating method or the like of typical liquid crystal element assembling steps.

Further, by using the typical liquid crystal element assembling steps, the both substrates are pasted via the liquid crystal layer 30 to fabricate the liquid crystal lenticular lens element 64.

Further, as the structural member of the stereoscopic display device 90 shown in FIG. 2, the liquid crystal lenticular lens element 64 of the fourth embodiment may also be employed instead of the liquid crystal lenticular lens element 61.

(Effects and the Like of Fourth Embodiment)

The liquid crystal lenticular lens element 64 of the fourth embodiment employs the structure with which the spacers 55 for adjusting the liquid crystal alignment are provided to be in parallel to the other direction (Y direction) at the border sections of each of the repeating units on the second substrate 20. That is, the liquid crystal lenticular lens element 64 employs the structure where the spacers 55 are provided in the vicinity of the border sections of each of the repeating units, so that disturbance in the liquid crystal alignment at the end parts of the repeating units can be decreased. This makes it possible to improve the lens performance of the liquid crystal lenticular lens element.

Other structures and actions are the same as those shown in the first embodiment described above, and other operational effects to be generated are also the same.

Fifth Embodiment

A fifth embodiment of the liquid crystal lenticular lens element according to the present invention will be described by referring to FIG. 13 and FIG. 14.

Figure 13:
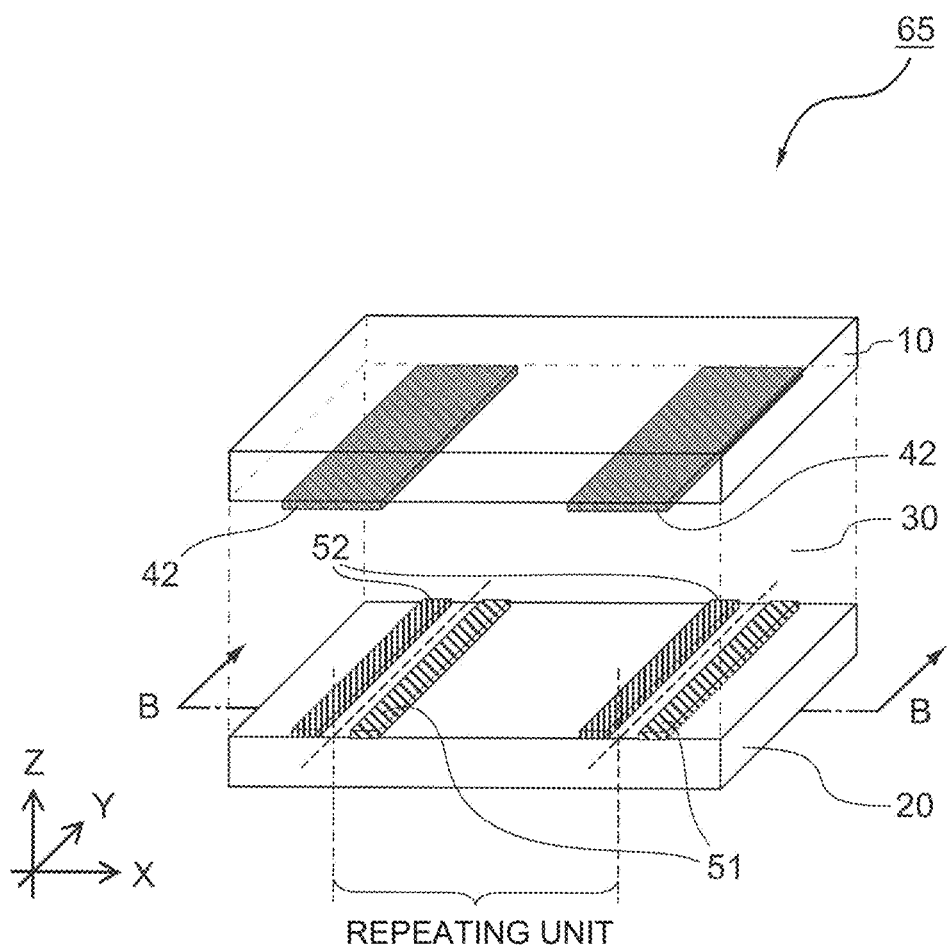
FIG. 13 is a perspective view showing the structure of a liquid crystal lenticular lens element according to a fifth embodiment of the present invention.

As shown in FIG. 13 and FIG. 14A that is a cross-section view taken along B-B line shown in FIG. 13, a liquid crystal lenticular lens element 65 according to the fifth embodiment is different from the first embodiment described above in configuration of the first electrode formed on the first substrate 10. Thus, particularly the structures and the actions regarding that different point will be described herein. Further, same reference numerals are used for the equivalent structural members as those of each of the embodiments described above, and explanations thereof are omitted.

(Overall Structures)

As shown in FIG. 13 and FIG. 14A, the liquid crystal lenticular lens element 65 has stripe-shaped repeating units repeated in the X direction. As the first electrodes on the first substrate 10, stripe-shaped electrodes 42 constituted with a plurality of stripe-shaped electrodes in parallel to the longitudinal direction (Y direction) of the repeating unit are employed.

Each of the stripe-shaped electrodes on the first substrate 10 is provided at the border section of the repeating unit and at positions opposing to the two stripe-shaped electrodes (52 and 51) located in the vicinity of the border sections as the second electrodes, and the neighboring electrodes are connected mutually.

That is, each of the stripe-shaped electrodes on the first substrate 10 is disposed to go over the border line of the neighboring repeating units at the end parts of the both ends of the repeating unit in the short direction. Through mutually connecting each of the stripe-shaped electrodes, a single-unit stripe-shaped electrode 42 is formed.

Hereinafter, each of the stripe-shaped electrodes constituting the stripe-shaped electrode 42 will be described by using the same reference numeral for convenience.

Further, as shown in FIG. 13, the centers of each of the stripe-shaped electrodes 42 in X direction come to match the border lines of the repeating units, and the single-unit stripe-shaped electrode 42, and the two stripe-shaped electrodes (52 and 51) disposed in the vicinity of the border lines of the repeating units, are disposed to oppose to each other via the liquid crystal layer 30.

In addition, the stripe-shaped electrode 42 on the first substrate 10 and the stripe-shaped electrodes 51, 52 on the second substrate 20 are disposed to be in parallel to each other, and voltages can be applied to each of those individually.

A fabricating method of the liquid crystal lenticular lens element 65 is the same as that of the first embodiment described above, (Explanation of Actions)

Subsequently, actions of the liquid crystal lenticular lens element 65 when voltages are applied will be described by referring to FIG. 14.

For example, in a case where the stripe-shaped electrode 42 is set as 0V and an equivalent voltage of equal to or larger than the threshold voltage of the liquid crystal is applied to the two stripe-shaped electrodes 51, 52, the refractive index distribution as in FIG. 14B is formed.

In the meantime, in a case where voltages are applied in such a manner that the amplitude of the applied voltage of the stripe-shaped electrode 51 becomes larger than the amplitude of the applied voltage of the stripe-shaped electrode 52, the refractive index distribution as in FIG. 14C is formed. In the meantime, in a case where voltages are applied in such a manner that the amplitude of the applied voltage of the stripe-shaped electrode 51 becomes smaller than the amplitude of the applied voltage of the stripe-shaped electrode 52, the refractive index distribution as in FIG. 14D is formed.

As described above, through adjusting the voltages to be applied to each of the electrodes as the first electrodes or the second electrodes, i.e., through forming the refractive index distribution corresponding to the position of the viewer, the light emitting directions can be controlled effectively as in the cases shown in FIG. 3 to FIG. 5. Note that FIGS. 14B, 14C, and 14D correspond to FIG. 3, FIG. 4, and FIG. 5, respectively.

(Effects and the Like of Fifth Embodiment)

The fifth embodiment employs the structure with which: the stripe-shaped electrodes in the same shape as those of the first embodiment described above are employed in the second substrate 20; the stripe-shaped electrodes 42 are provided at the both end parts of the repeating units in the short direction on the first substrate 10; and the neighboring stripe-shaped electrodes 42 are connected mutually. Therefore, light rays significant to the directions of the both eyes of the viewer can be emitted through changing the voltages of the stripe-shaped electrodes 51 and 52 in accordance with the position of the viewer.

Further, as the structural member of the stereoscopic display device 90 shown in FIG. 2, the liquid crystal lenticular lens element 65 of the fifth embodiment may also be employed instead of the liquid crystal lenticular lens element 61.

Other structures and actions are the same as those shown in the first embodiment described above, and other operational effects to be generated are also the same.

Sixth Embodiment

A sixth embodiment of the liquid crystal lenticular lens element according to the present invention will be described by referring to FIG. 15 and FIG. 16. In particular, different points of a liquid crystal lenticular lens element 66 in terms of the structures with respect to the above-described liquid crystal lenticular lens element 61 (first embodiment) will be described herein. Further, same reference numerals are used for the equivalent structural members as those of each of the embodiments described above, and explanations thereof are omitted.

(Overall Structures)

Figure 15:
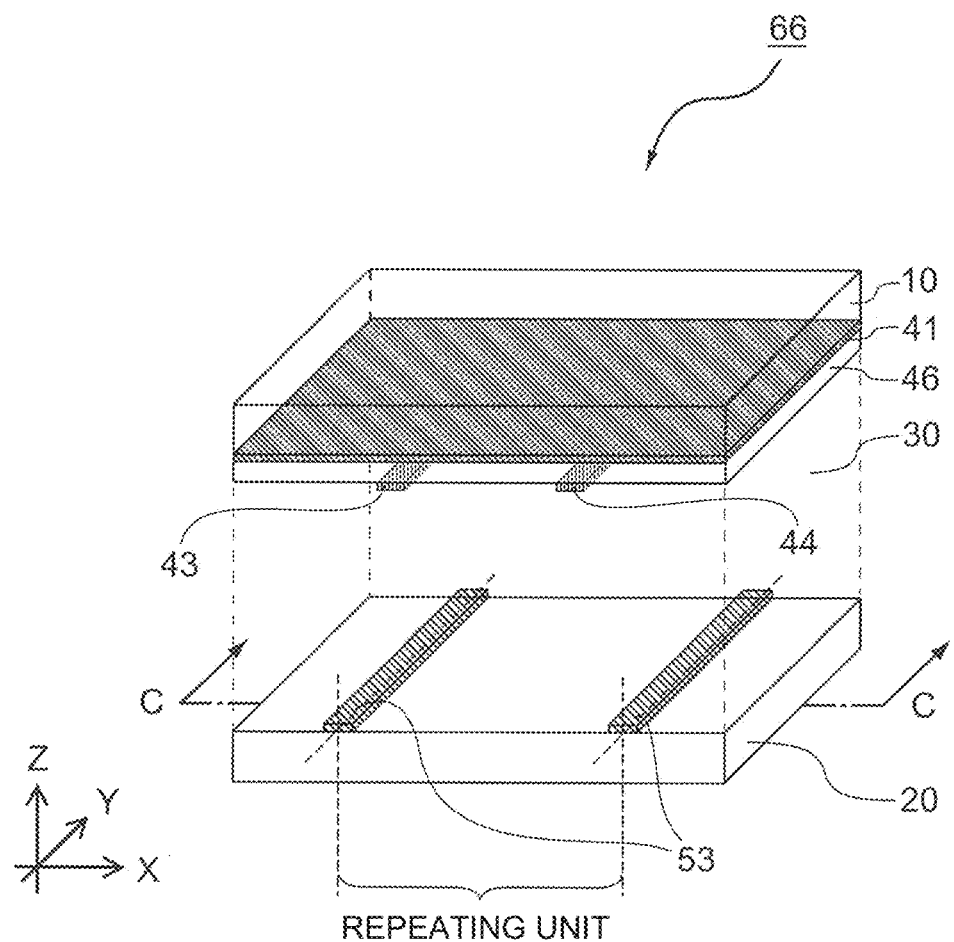
FIG. 15 is a perspective view showing the structure of a liquid crystal lenticular lens element according to a sixth embodiment of the present invention.

As shown in FIG. 15 and FIG. 16A that is a cross-section view taken along C-C line shown in FIG. 15, the liquid crystal lenticular lens element 66 of the embodiment has stripe-shaped repeating units repeated in the X direction. At the same time, an insulating layer 46 is stacked further on the first substrate 10 where the surface electrode 41 is formed, and stripe-shaped electrodes 43, 44 in parallel to the longitudinal direction of the repeating unit are formed thereon. That is, the sixth embodiment employs the first electrode constituted with the surface electrode 41, the insulating layer 46, and the stripe-shaped electrodes 43, 44 in parallel to the longitudinal direction of the repeating unit, which are formed in order from the first substrate 10 side.

Further, also employed is a structure with which a stripe-shaped electrode 53 constituted with a plurality of stripe-shaped electrodes in parallel to the longitudinal direction of the unit is provided as a second electrode on the border lines of each of the repeating units on the second substrate 20.

Looking at the repeating unit herein on the first substrate 10, one (44 or 43) of the stripe-shaped electrodes is located at one end side of the repeating unit in the short direction while the other stripe-shaped electrode (44 or 43) is located at the other end side of the repeating unit in the short direction.

Further, each of the stripe-shaped electrodes on the second substrate 20 is located at both ends of the repeating unit in the short direction and the neighboring stripe-shaped electrodes are connected to each other, thereby forming a single stripe-shaped electrode 53.

Hereinafter, each of the stripe-shaped electrodes constituting the stripe-shaped electrode 53 will also be described by using the same reference numeral for convenience.

As shown in FIG. 15, in the liquid crystal lenticular lens element 66, the insulating layer 46 and the stripe-shaped electrodes 43, 44 formed thereon are disposed to oppose to the second substrate 20 and the stripe-shaped electrode 53 formed thereon via the liquid crystal layer 30, the stripe-shaped electrodes 43, 44 and the stripe-shaped electrode 53 are formed to be in parallel to each other, and voltages can be applied thereto individually.

Now, an example of a manufacturing method of the liquid crystal lenticular lens element 66 shown in FIG. 15 will be described.

The first electrode on the first substrate 10 is fabricated by, for example: using a glass substrate for the first substrate 10; performing pattern-processing a transparent conductive film such as for formed by sputtering deposition on the substrate to form the surface electrode 41; forming the insulating film 46 constituted with a silicon oxide or the like by sputtering deposition; and forming a transparent conductive film such as ITO and performing pattern-processing again thereafter to form the stripe-shaped electrodes 43, 44.

Further, a glass substrate is used as the second substrate 20, for example, and a transparent conductive film such as ITO formed thereon by sputtering deposition is pattern-processed to form the stripe-shaped electrode 53 as the second electrode.

Thereafter, as in the case of the first embodiment described above, polyimide is applied on the first substrate 10 and the second substrate 20, rubbing processing is performed, and the both substrates are pasted via the liquid crystal layer 30 with typical liquid crystal element assembling steps. Thereby the liquid crystal lenticular lens element 66 as shown in FIG. 15 can be fabricated.

(Explanation of Actions)

Subsequently, actions of the liquid crystal lenticular lens element 66 when voltages are applied will be described by referring to FIG. 16.

For example, in a case where the surface electrode 41 and the stripe-shaped electrodes 43, 44 are set as 0V and a voltage of equal to or larger than the threshold voltage of the liquid crystal is applied to the stripe-shaped electrode 53, acquired is the refractive index distribution symmetric with respect to the optical axis as shown in FIG. 16B.

In the meantime, in a case where the voltage of the surface electrode 41 and the stripe-shaped electrode 53 is set as 0V and the amplitude of the applied voltage of the stripe-shaped electrode 43 is adjusted to become larger than the amplitude of the applied voltage of the stripe-shaped electrode 44, acquired is the refractive index distribution as in FIG. 16C. Meanwhile, in a case where the amplitude of the applied voltage of the stripe-shaped electrode 43 is adjusted to become smaller than the amplitude of the applied voltage of the stripe-shaped electrode 44, acquired is the refractive index distribution as in FIG. 16D.

As described above, through adjusting the voltages to be applied to each of the electrodes as the first electrodes or the second electrodes, i.e., through forming the refractive index distribution corresponding to the position of the viewer, the light emitting directions can be controlled effectively as in the cases shown in FIG. 3 to FIG. 5.

(Effects and the Like of Sixth Embodiment)

The sixth embodiment employs the structure with which: the first electrode constituted with the surface electrode 41 and the stripe-shaped electrodes 43, 44 on the insulating layer 46 formed thereon and the stripe-shaped electrode 53 as the second electrode are disposed to oppose to each other via the liquid crystal layer 30 while being in parallel to each other. Therefore, light rays significant to the directions of the both eyes of the viewer can be emitted through changing the voltages to be applied to each of the electrodes (41, 43, 44, and 53) in accordance with the positions of the viewer.

Further, as the structural member of the stereoscopic display device 90 shown in FIG. 2, the liquid crystal lenticular lens element 66 of the sixth embodiment may also be employed instead of the liquid crystal lenticular lens element 61.

Other structures and actions are the same as those shown in the first embodiment described above, and other operational effects to be generated are also the same.

Seventh Embodiment

A seventh embodiment of the liquid crystal lenticular lens element according to the present invention will be described by referring to FIG. 17 and FIG. 18. In particular, different points of a liquid crystal lenticular lens element 67 in terms of the structures with respect to the above-described liquid crystal lenticular lens element 61 (first embodiment) will be described herein. Further, same reference numerals are used for the equivalent structural members as those of each of the embodiments described above, and explanations thereof are omitted.

(Overall Structures)

Figure 17:
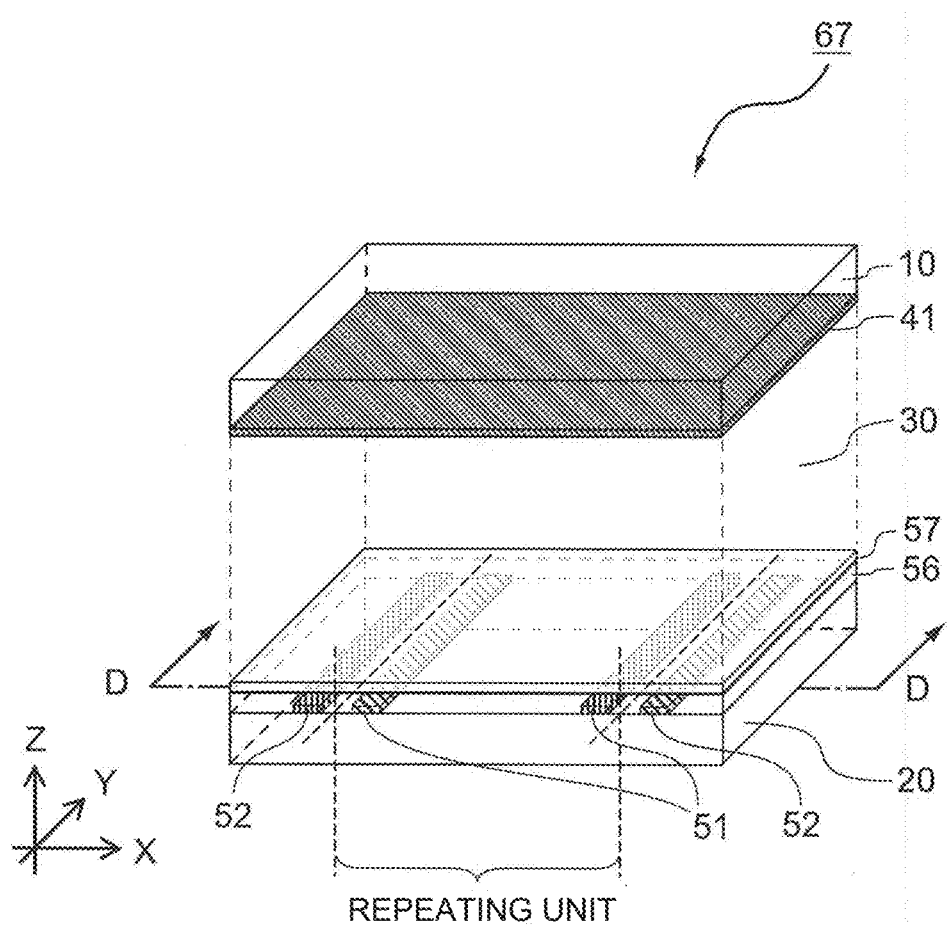
FIG. 17 is a perspective view showing the structure of a liquid crystal lenticular lens element according to a seventh embodiment of the present invention.

As shown in FIG. 17 and FIG. 18A that is a cross-section view taken along D-D line shown in FIG. 17, the liquid crystal lenticular lens element 67 of the seventh embodiment has stripe-shaped repeating units repeated in the X direction. Further, the second substrate 20 includes: the stripe-shaped electrodes 51, 52; an insulating layer 56 formed to cover the stripe-shaped electrodes 51, 52; and a high-resistance layer 57 formed on the insulating layer 56.

The stripe-shaped electrodes 51 and 52 formed to be in parallel to each other on the second substrate 20 are in parallel in the longitudinal direction in the repeating unit, one (51 or 52) of the stripe electrodes is located at one end side of the repeating unit in the short direction, and the other one (52 or 51) of the striped electrodes is located at the other end side in the short direction.

Further, voltages can be applied individually to the surface electrode 41 on the first substrate 10 and each of the stripe-shaped electrodes 51 and 52 on the second substrate 20.

Now, an example of a manufacturing method of the liquid crystal lenticular lens element 67 shown in FIG. 17 will be described.

For example, a glass substrate is used as the first substrate 10, and a transparent conductive film such as ITO formed thereon by sputtering deposition is pattern-processed to form the surface electrode 41 as the first electrode.

Further, for example, a transparent conductive film such as ITO formed by sputtering deposition on the second substrate 20 that is a glass substrate is pattern-processed to form the stripe-shaped electrodes 51 and 52. Then, the insulating layer 56 is formed by using silicon oxide or the like by sputtering deposition or the like. Thereafter, the high-resistance layer 57 as a thin film of zinc oxide or the like is formed by sputtering deposition and the like.

Subsequently, as in the case of the first embodiment, polyimide is applied on the first substrate 10 and the second substrate 20, rubbing processing is performed, and the both substrates are pasted via the liquid crystal layer 30 with typical liquid crystal element assembling steps to form the liquid crystal lenticular lens element 67.

(Explanation of Actions)

Subsequently, actions of the liquid crystal lenticular lens element 67 when voltages are applied will be described by referring to FIG. 18.

For example, in a case where the surface electrode 41 is set as 0V and a voltage of equal to or larger than the threshold voltage of the liquid crystal is applied to the two stripe-shaped electrodes 51, 52, acquired is the refractive index distribution symmetric with respect to the optical axis as in FIG. 18B.

In the meantime, in a case where the voltages are applied in such a manner that the amplitude of the applied voltage of the stripe-shaped electrode 51 becomes larger than the amplitude of the applied voltage of the stripe-shaped electrode 52, acquired is the refractive index distribution as in FIG. 18C. Meanwhile, in a case where the voltages are applied in such a manner that the amplitude of the applied voltage of the stripe-shaped electrode 51 becomes smaller than the amplitude of the applied voltage of the stripe-shaped electrode 52, acquired is the refractive index distribution as in FIG. 18D.

(Effects and the Like of Seventh Embodiment)

The seventh embodiment employs the structure with which: on the second substrate 20, the stripe-shaped electrodes 51, 52, the insulating layer 56, and the high-resistance layer 57 are provided in this order from the second substrate 20 side. This makes it possible to utilize the potential distribution generated by the electric resistance of the high-resistance layer 57. Therefore, it is possible to form the potential distribution of still wider range between the stripe-shaped electrodes 51 and 52 compared to the case of the first embodiment described above.

That is, by providing the high-resistance layer 57 together with the insulating layer 56, control of the refractive index distribution formed by aligning the liquid crystal in accordance with the potential distribution becomes easy. Thus, the lens performance of the liquid crystal lenticular lens element can be improved further.

With the refractive index distribution formed by changing the voltage signals applied to the stripe-shaped electrodes 51 and 52 in accordance with the positions of the viewer, function as the cylindrical lens is obtained and the light rays from the video display unit can be polarized effectively. Thereby, significant light rays can be emitted to the directions of the both eyes of the viewer.

Further, as the structural member of the stereoscopic display device 90 shown in FIG. 2, the liquid crystal lenticular lens element 67 of the seventh embodiment may also be employed instead of the liquid crystal lenticular lens element 61.

Other structures and actions are the same as those shown in the first embodiment described above, and other operational effects to be generated are also the same.

Eighth Embodiment

An eighth embodiment of the liquid crystal lenticular lens element according to the present invention will be described by referring to FIG. 19 and FIG. 20. Same reference numerals are used for the equivalent structural members as those of each of the embodiments described above, and explanations thereof are omitted.

(Overall Structures)

Figure 19:
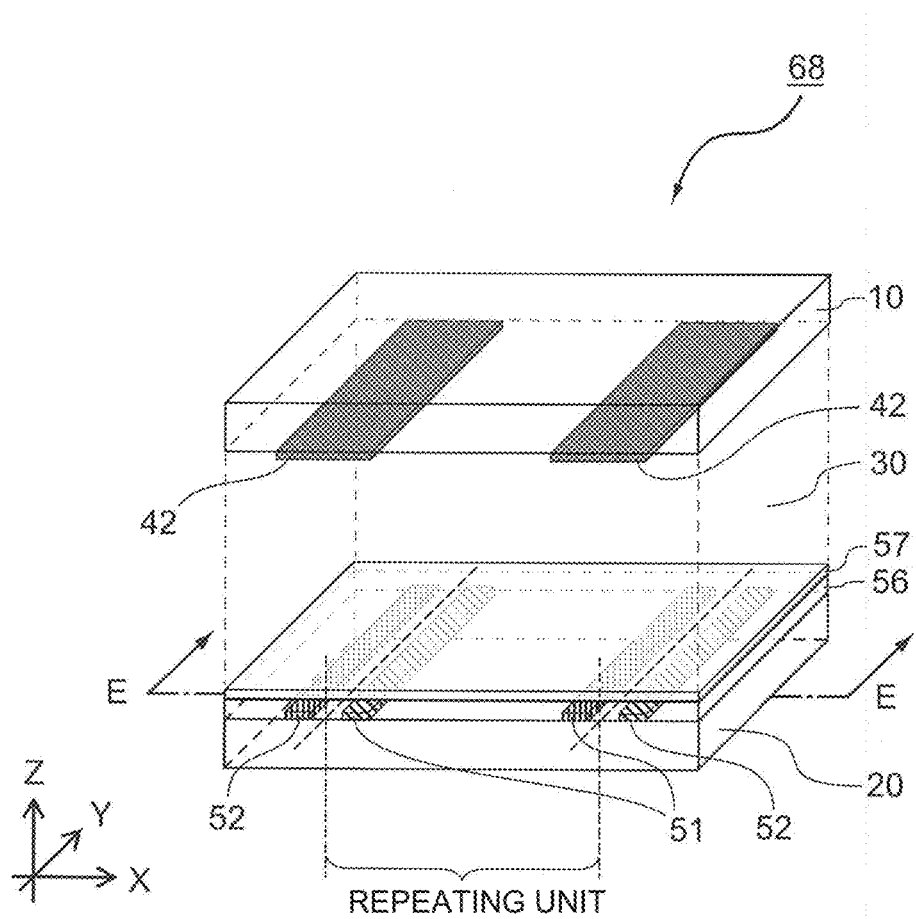
FIG. 19 is a perspective view showing the structure of a liquid crystal lenticular lens element according to an eighth embodiment of the present invention.
Figure 20A:
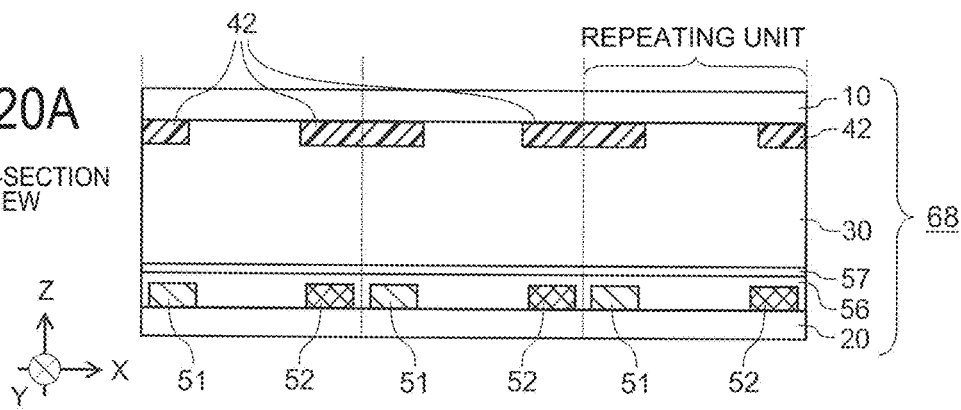

As shown in FIG. 19 and FIG. 20A that is a cross-section view taken along E-E line shown in FIG. 19, the liquid crystal lenticular lens element 68 of the eighth embodiment is characterized to include the structure of the first electrode on the first substrate 10 employed in the fifth embodiment and the structures regarding the second electrode and the like on the second substrate 20 employed in the seventh embodiment.

That is, the stripe-shaped electrode 42 is formed on the first substrate 10, while the stripe-shaped electrodes 51, 52, the insulating layer 56, and the high-resistance layer 57 are provided in this order from the second substrate 20 side. Further, the liquid crystal lenticular lens element 68 includes the liquid crystal layer 30 sandwiched between the both substrates.

The stripe-shaped electrodes 51 and 52 of the second substrate 20 are in parallel to each other, and voltages can be applied to each of those individually. Further, the stripe-shaped electrode 42 and the stripe-shaped electrodes 51, 52 are in parallel in the longitudinal direction of the repeating unit. The liquid crystal lenticular lens element 68 also has the stripe-shaped repeating structure constituted with the repeating units continued in the X direction as in the above-described case.

The liquid crystal lenticular lens element 68 of the eighth embodiment can be fabricated in the same manner as that of the liquid crystal lenticular lens element 67 of the seventh embodiment described above.

(Explanation of Actions)

Subsequently, actions of the liquid crystal lenticular lens element 68 when voltages are applied will be described by referring to FIG. 20.

Figure 20B:
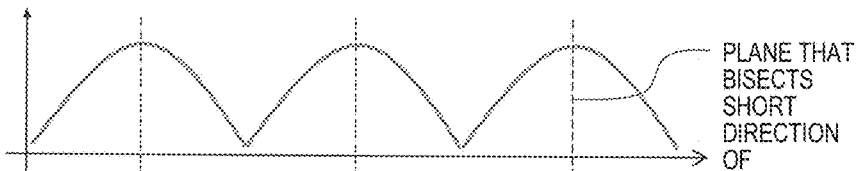

For example, in a case where the stripe-shaped electrode 42 is set as 0V and an equivalent voltage of equal to or larger than the threshold voltage of the liquid crystal is applied to each of the two stripe-shaped electrodes 51, 52, the refractive index distribution symmetric with respect to the optical axis as in FIG. 20B is formed.

Figure 20C:
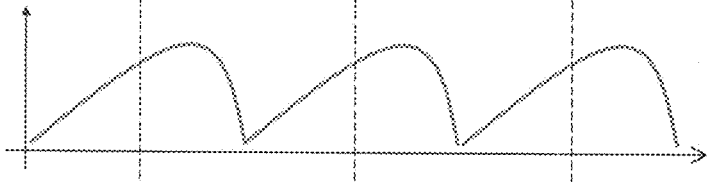
Figure 20D:
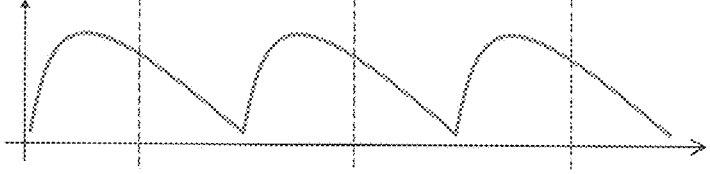

In the meantime, in a case where voltages are applied in such a manner that the amplitude of the applied voltage of the stripe-shaped electrode 51 becomes larger than the amplitude of the applied voltage of the stripe-shaped electrode 52, the refractive index distribution as in FIG. 20C is formed. Meanwhile, in a case where voltages are applied in such a manner that the amplitude of the applied voltage of the stripe-shaped electrode 51 becomes smaller than the amplitude of the applied voltage of the stripe-shaped electrode 52, the refractive index distribution as in FIG. 20D is formed.

As described above, through forming the refractive index distribution corresponding to the position of the viewer, the light emitting directions can be controlled effectively as in the cases shown in FIG. 3 to FIG. 5.

(Effects and the Like of Eighth Embodiment)

In the eighth embodiment, the high-resistance layer 57 is provided. This makes it possible to form the potential distribution of still wider range between the stripe-shaped electrodes 51 and 52 by utilizing the potential distribution generated by the electric resistance of the high-resistance layer 57. Therefore, control of the refractive index distribution formed by aligning the liquid crystal in accordance with the potential distribution becomes easier than the case of the fifth embodiment described above. Thus, the lens performance of the liquid crystal lenticular lens element can be improved.

Therefore, with the liquid crystal lenticular lens element 68, it is possible to emit the light rays suited for the directions of the both eyes of the viewer more flexibly through changing the voltage signals applied to the stripe-shaped electrode 42 and the stripe-shaped electrodes 51, 52 in accordance with the positions of the viewer.

Further, as the structural member of the stereoscopic display device 90 shown in FIG. 2, the liquid crystal lenticular lens element 68 of the eighth embodiment may also be employed instead of the liquid crystal lenticular lens element 61.

Other structures and actions are the same as those shown in the first embodiment described above, and other operational effects to be generated are also the same.

Ninth Embodiment

Herein, a display device (stereoscopic display device) including the liquid crystal lenticular lens element according to each of the above-described embodiments and a terminal device loading the display device will be described by referring to FIG. 2 and FIG. 21 as a ninth embodiment according to the present invention. Same reference numerals are used for the equivalent structural members as those of each of the embodiments described above, and explanations thereof are omitted.

(Explanation of Actions)

A terminal device 99 includes: a display device 90 constituted with a stacked unit of a liquid crystal display panel and the liquid crystal lenticular lens element 61; and an operation unit 91 which receives instructions from a user (viewer) and outputs instruction signals to the display device 90 based on the instructions.

The terminal device 99 is structured to detect the spatial position of the head part of the viewer and further the positions and movement of the eyeballs of the viewer by utilizing a camera (not shown) loaded to the terminal itself. That is, the camera is employed herein as the detection unit 80 of FIG. 2, and an image analysis method is used together with the camera for detection.

The control unit 81 (FIG. 2) controls the liquid crystal lenticular lens element so that necessary light for recognizing stereoscopic images can make incident on the optimum position in accordance with the detected positions and movement of the eyeballs of the viewer.

That is, it is so designed that the control unit 81 generates electric signals and applies those to each electrode based on the positional information acquired from the camera as the detection unit 80 so as to adjust the refractive index distribution that contributes to allotment of the emitted light from the video display unit 70 (FIG. 2).

Through employing such structures, it becomes possible to provide fine stereoscopic display to the viewer even when the viewer moves in front of the terminal device 99 and when the viewer moves the line of sight while holding the terminal device 99.

(Explanation of Actions)

Next, actions of the stereoscopic display device 90 shown in FIG. 2 and the terminal device 99 shown in FIG. 21 will be described based on the flowchart shown in FIG. 22.

Figure 22:
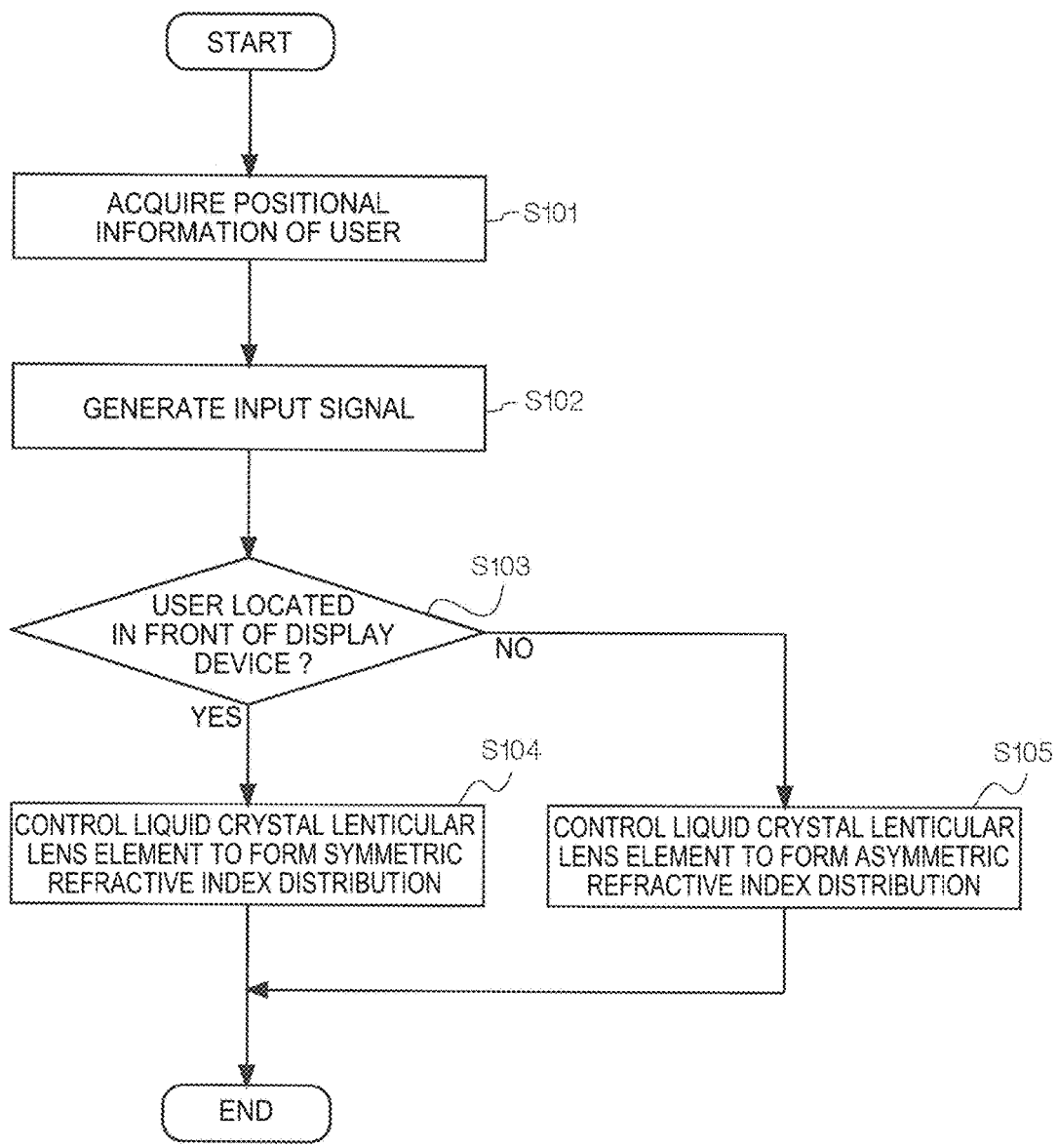
FIG. 22 is a flowchart showing actions regarding a driving method of the liquid crystal lenticular lens elements disclosed in FIG. 1 and the like loaded on the stereoscopic display device disclosed in FIG. 2 and the terminal device disclosed in FIG. 21.
Figure 23:
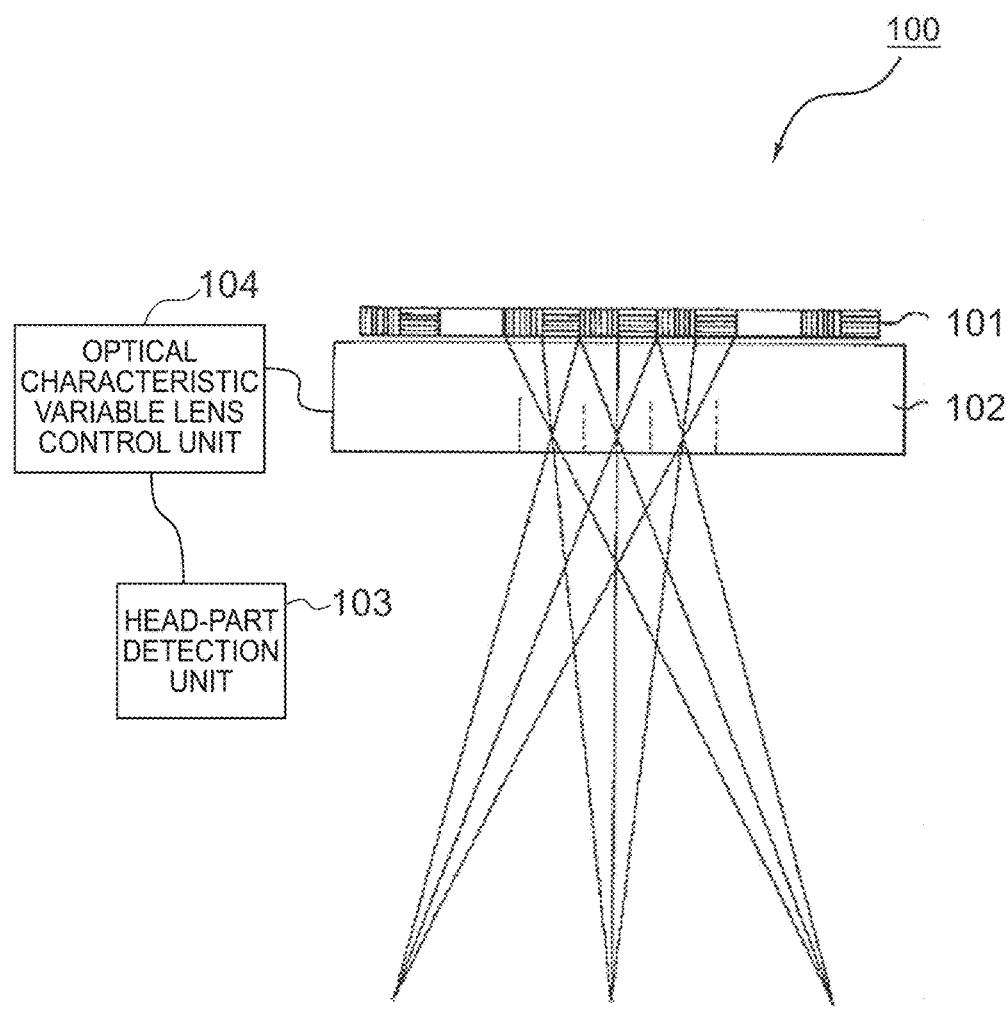
FIG. 23 is an explanatory chart showing the structure of a head-following type three-dimensional display according to a related technique.
Figure 24:
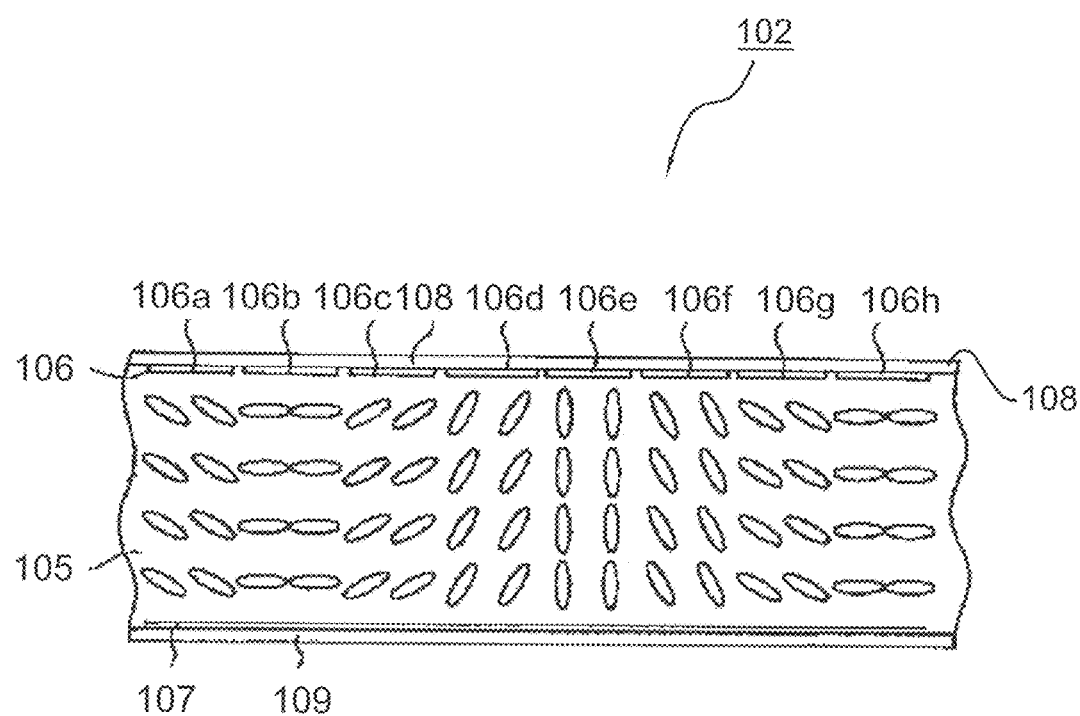
FIG. 24 is an explanatory chart showing the structure of an optical characteristic variable lens used in the head-following type three-dimensional display according to the related technique.

First, the detection unit (camera) 80 acquires the positional information of the head part of the user (FIG. 22: step S101), and generates input signals for the control unit 81 based on the acquired positional information (FIG. 22: step S102).

Then, the control unit 81 drives the liquid crystal lenticular lens element 61 based on the input signals from the detection unit 80.

That is, in a case where the user (viewer) is located in front of the display device 90 (in a case shown in FIG. 3) (FIG. 22: step S103/Yes), the control unit 81 drives the liquid crystal lenticular lens element 61 to form a laterally symmetric refractive index distribution (FIG. 22: step S104). In the meantime, in a case where the user (viewer) is located in an oblique direction from the display device 90 (in a case shown in FIG. 4 or FIG. 5) (FIG. 22: step S103/No), the control unit 81 drives the liquid crystal lenticular lens element 61 to form an asymmetric refractive index distribution (FIG. 22: step S105).

(Effects and the Like of Ninth Embodiment)

In the above, the structure with which the display device (stereoscopic display device) 90 shown in the first embodiment is placed to the terminal device 99 is employed as a way of example. However, as the liquid crystal lenticular lens element included in the display device 90, not only the liquid crystal lenticular lens element 61 of the first embodiment but also each of the liquid crystal lenticular lens elements 62 to 68 of the second to eighth embodiments may be employed.

Further, this example is described by referring to FIG. 2, so that the display device 90 is described to include the detection unit 80 and the control unit 81. However, one of or both of the detection unit 80 and the control unit 81 may be provided to the outside of the display device 90, e.g., the control unit 81 may be provided inside the operation unit 91.

Other structures and actions are the same as those shown in each of the embodiments described above, and other operational effects to be generated are also the same.

Further, it is also possible to employ the structure with which: light is irradiated by using another light source as necessary in order to make it easy to perform image analysis to detect the spatial position of the head part of the viewer and, further, the positions and movement of the eyeballs; and a limbus tracking method which uses the difference between the iris and the white of the eyes or a corneal reflection method which uses reflection of the corneal may be used.

As described above, the terminal device 99 that can be formed as a still lighter structure through mounting the liquid crystal lenticular lens element of each of the above-described embodiments makes it possible to smoothly display proper stereoscopic images in accordance with the position fluctuation of the viewer with the simple structure.

(Others)

While each of the embodiments has been described based on the two-eye type for convenience considering that explanations may become complicated with the case of multi-eye type, the content of each of the embodiments of the present invention can be applied without problems and the same effects can be acquired even when the multi-eye type is employed.

Note that each of the above-described embodiments shows preferred specific examples of the liquid crystal lenticular lens element, the stereoscopic display device including the liquid crystal lenticular lens element, the terminal device to which the stereoscopic display device is loaded, and the driving method of the liquid crystal lenticular lens element, and various kinds of technically preferable limitations may be added in some cases. However, the technical range of the present invention is not limited only to those modes unless there is no specific depiction for limiting the present invention.

Followings are the summary of the new technical content of the above-described embodiments. Note, however, that the present invention is not necessarily limited to those.

(Supplementary Note 1)

A liquid crystal lenticular lens element which includes: a first substrate 10; a second substrate 20 in parallel thereto; a liquid crystal layer 30 provided between both substrates; a first electrode formed on the liquid crystal layer 30 side of the first substrate 10; and second electrodes including a plurality of stripe-shaped electrodes formed on the liquid crystal layer 30 side of the second substrate 20, wherein:

a stripe-shaped repeating structure including repeating units placed along an arrangement direction (X direction) of the second electrodes is formed; and an asymmetric refractive index distribution with respect to a plane bisecting each of the repeating units to another direction (Y direction) that is perpendicular to the arrangement direction is induced by an electric signal applied to each of the electrodes from outside.

(Supplementary Note 2)

The liquid crystal lenticular lens element as depicted in Supplementary Note 1, wherein the repeating structure is a structure that is based on arrangement of at least the first electrode or the second electrodes.

The liquid crystal lenticular lens element as depicted in Supplementary Note 1 or 2, wherein:

the refractive index distribution corresponds to each of the repeating units and has a periodic structure along the arrangement direction; and the repeating unit (Pe) that is a shortest length of the repeating structure is equivalent to a length (Pn) per period of the periodic structure.

(Supplementary Note 4) <First and Second Embodiments, FIGS. 1, 6 to 9, and 10>

The liquid crystal lenticular lens element as depicted in claim any one of Supplementary Notes 1 to 3, wherein:

the first electrode is a surface electrode 41 formed over an entire region of the repeating units;

two electrodes (51, 52) among each of the stripe-shaped electrodes as the second electrodes are formed within each of the repeating units;

the two stripe-shaped electrodes (51, 52) are formed at one end side and other end side of the repeating unit where each of those electrodes are formed while each being in parallel to that other direction; and the asymmetric refractive index distribution is inducted by applying independent voltage signals as the electric signals to each of the two stripe-shaped electrodes (51, 52).

(Supplementary Note 5)<Third Embodiment, FIG. 11>

The liquid crystal lenticular lens element as depicted in Supplementary Note 4, wherein the first substrate 10 includes a black matrix 45 for shielding light placed at border sections of each of the repeating units and at positions opposing to the two stripe-shaped electrodes as the second electrodes located near the border sections.

(Supplementary Note 6) <Fourth Embodiment, FIG. 12>

The liquid crystal lenticular lens element as depicted in Supplementary Note 4, wherein
    the second substrate 20 includes a spacer 55 for adjusting liquid crystal alignment provided to be in parallel to the other direction at the border section of each of the repeating units.

(Supplementary Note 7) <Fifth Embodiment and the Like, FIGS. 13 and 14>

The liquid crystal lenticular lens element as depicted in Supplementary Note 4 or 6, wherein:
    a plurality of stripe-shaped electrodes 42 in parallel to the other direction are used as the first electrodes instead of the surface electrode 41; and
    each of the stripe-shaped electrodes 42 as the first electrodes is placed at border sections of each of the repeating units and at positions opposing to the two stripe-shaped electrodes as the second electrodes located near the border sections, and also connected mutually.

(Supplementary Note 8) <Seventh and Eighth Embodiments and the Like, FIG. 17 to FIG. 20>

The liquid crystal lenticular lens element as depicted in Supplementary Note 4 or 7, wherein
    the second electrode further includes an insulating layer 56 formed to cover the two stripe-shaped electrodes (51, 52), and a high-resistance layer 57 formed on the insulating layer 56.

(Supplementary Note 9) <Sixth Embodiment, FIG. 15, FIG. 16>

The liquid crystal lenticular lens element as depicted in any one of Supplementary Notes 1 to 3, wherein:
    the first electrode includes a surface electrode formed over an entire region of the repeating units, an insulating layer 46 formed on the surface electrode, and a plurality of stripe-shaped electrodes formed on the insulating layer 46 to be in parallel to the other direction;
    two electrodes (43, 44) among each of the stripe-shaped electrodes as the first electrodes are formed;
    each of the two stripe-shaped electrodes (43, 44) is formed at one end side and other end side of the repeating unit where each of those electrodes are formed;
    the second electrodes are a plurality of stripe-shaped electrodes (53) in parallel to the other direction, and each of the stripe-shaped electrodes 53 is connected mutually; and
    the asymmetric refractive index distribution is inducted by applying independent voltage signals as the electric signals to each of the two stripe-shaped electrodes (43, 44).

(Supplementary Note 10) <FIG. 2 and the Like>

A stereoscopic display device 90 which includes:
    a video display unit 70 which emits light regarding parallax images;
    a directivity/direction control element which is capable of controlling directions of light emitted from the video display unit 70 by an electric signal applied from outside;
    a detection unit 80 which detects spatial position of a head part of a viewer; and
    a control unit 81 which controls actions of the directivity/direction control element based on information regarding the spatial position outputted from the detection unit, wherein:
    the liquid crystal lenticular lens element (61 to 68) as depicted in any one of Supplementary Notes 1 to 9 is mounted as the directivity/direction control element; and
    the control unit 81 generates the electric signal corresponding to the information of the spatial position and applies the signal to each electrode provided to the liquid crystal lenticular lens element (61 to 68).

Figure 21:
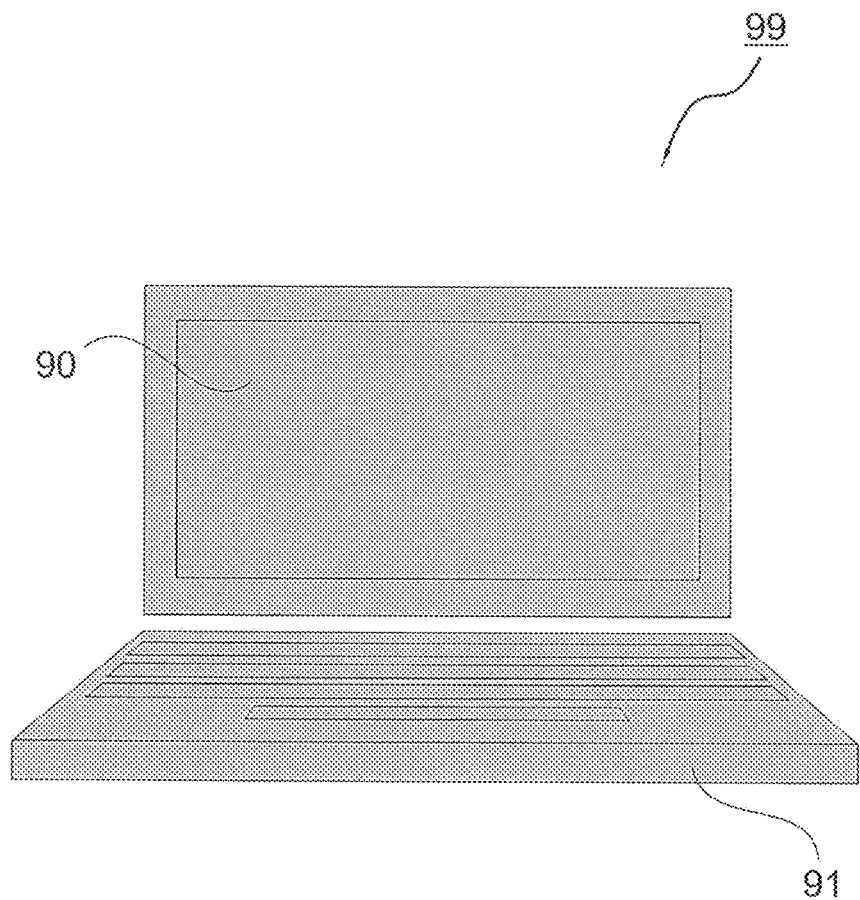
FIG. 21 is a schematic view showing an example of a terminal device according to a ninth embodiment of the preset invention on which a stereoscopic display device including the liquid crystal lenticular lens element according to each of the above-described embodiments disclosed in FIG. 1 and the like is loaded.

(Supplementary Note 11) <Ninth Embodiment, FIG. 21>

A terminal device 99 which includes:
    the stereoscopic display device 90 as depicted in Supplementary Note 10, and an operation unit 91 which receives an instruction from a user and outputs an instruction signal based on the instruction to the stereoscopic display device 90.

(Supplementary Note 12)

A driving method of a liquid crystal lenticular lens element of a stereoscopic display device 90 which includes: the liquid crystal lenticular lens element including a first substrate 10, a second substrate 20 in parallel thereto, a liquid crystal layer 30 provided between both substrates, a first electrode formed on the liquid crystal layer 30 side of the first substrate 10, second electrodes including a plurality of stripe-shaped electrodes formed on the liquid crystal layer 30 side of the second substrate 20, and a stripe-shaped repeating structure formed with repeating units placed along arrangement direction (X direction) of the second electrodes; a detection unit 80 which detects spatial position of a head part of an observer (O); and a control unit 81 which generates and outputs the electric signal based on information regarding the spatial position outputted from the detection unit, wherein:
    the detection unit 80 acquires the positional information of the head part of the viewer;
    the detection unit 80 generates the signal based on the positional information and outputs it toward the control unit; and
    when the signal inputted from the detection unit 80 shows that the observer (O) is located in an oblique direction from the stereoscopic display device 90, the control unit 81 applies a voltage signal set in advance to the plurality of stripe-shaped electrodes to induce an asymmetric refractive index distribution with respect to a plane bisecting each of the repeating units in other direction that is perpendicular to the arrangement direction.

(Supplementary Note 13)

A driving method of a liquid crystal lenticular lens element of a stereoscopic display device 90 which includes: the liquid crystal lenticular lens element (61 to 68) depicted in any one of Supplementary Notes 4 to 9; a detection unit 80 which detects spatial position of a head part of a observer (O); and a control unit 81 which generates and outputs the electric signal based on information regarding the spatial position outputted from the detection unit, wherein:
    the detection unit 80 acquires the positional information of the head part of the observer (O);
    the detection unit 80 generates the signal based on the positional information and outputs it toward the control unit; and
    when the signal inputted from the detection unit 80 shows that the observer (O) is located in an oblique direction from the stereoscopic display device 90, the control unit 81 applies different voltage signals set in advance to the two stripe-shaped electrodes (51, 52) as the electric signals to induce the asymmetric refractive index distribution.

This application claims the Priority right based on Japanese Patent Application No. 2014-026478 filed on Feb. 14, 2014 and the disclosure thereof is hereby incorporated by reference in its entirety.

INDUSTRIAL APPLICABILITY

The present invention can be utilized for a display device including a liquid crystal lenticular lens element and a terminal device to which the display device is loaded.

REFERENCE NUMERALS

10 First substrate
20 Second substrate
30 Liquid crystal layer
41 Surface electrode
42 to 44 Stripe-shaped electrode
45 Black matrix
46 Insulating layer
51 to 53 Stripe-shaped electrode
55 Spacer
56 Insulating layer
57 high-resistance layer
61 to 68 Liquid crystal lenticular lens element
70 Video display unit
80 Detection unit
81 Control unit
90 Stereoscopic display device (display device)
91 Operation unit
99 Terminal device

The invention claimed is:

1. A liquid crystal lenticular lens element, comprising: a first substrate; a second substrate in parallel thereto; a liquid crystal layer provided between both substrates; a first electrode formed on the liquid crystal layer side of the first substrate; and second electrodes comprising a plurality of stripe-shaped electrodes formed on the liquid crystal layer side of the second substrate, wherein:
   a stripe-shaped repeating structure comprising repeating units placed along an arrangement direction of the second electrodes is formed; and
   an asymmetric refractive index distribution based on a mirror operation with respect to a plane bisecting each of the repeating units between the second electrodes to another direction that is perpendicular to the arrangement direction is induced by an electric signal applied to each of the electrodes from outside.

2. The liquid crystal lenticular lens element as claimed in claim 1, wherein
   the repeating structure is a structure that is based on arrangement of at least one of the first electrode and the second electrodes.

3. The liquid crystal lenticular lens element as claimed in claim 1, wherein:
   the refractive index distribution corresponds to each of the repeating units and has a periodic structure along the arrangement direction; and
   the repeating unit that is a shortest length of the repeating structure is equivalent to a length per period of the periodic structure.

4. The liquid crystal lenticular lens element as claimed in claim 1, wherein:
   the first electrode is a surface electrode formed over an entire region of the repeating units;
   two electrodes among each of the stripe-shaped electrodes as the second electrodes are formed within each of the repeating units;
   the two stripe-shaped electrodes are formed at one end side and other end side of the repeating unit where each of those electrodes are formed while each being in parallel to that other direction; and
   the asymmetric refractive index distribution is inducted by applying independent voltage signals as the electric signals to each of the two stripe-shaped electrodes.

5. The liquid crystal lenticular lens element as claimed in claim 4, wherein
   the first substrate comprises a black matrix for shielding light placed at border sections of each of the repeating units and at positions opposing to the two stripe-shaped electrodes as the second electrodes located near the border sections.

6. The liquid crystal lenticular lens element as claimed in claim 4, wherein
   the second substrate comprises a spacer for adjusting liquid crystal alignment provided to be in parallel to the other direction at the border section of each of the repeating units.

7. The liquid crystal lenticular lens element as claimed in claim 4, wherein:
   a plurality of stripe-shaped electrodes in parallel to the other direction are used as the first electrodes instead of the surface electrode; and
   each of the stripe-shaped electrodes as the first electrodes is placed at border sections of each of the repeating units and at positions opposing to the two stripe-shaped electrodes as the second electrodes located near the border sections, and also connected mutually.

8. The liquid crystal lenticular lens element as claimed in claim 4, wherein
   the second electrode further comprises an insulating layer formed to cover the two stripe-shaped electrodes, and a high-resistance layer formed on the insulating layer.

9. The liquid crystal lenticular lens element as claimed in claim 1, wherein:
   the first electrode comprises a surface electrode formed over an entire region of the repeating units, an insulating layer formed on the surface electrode, and a plurality of stripe-shaped electrodes formed on the insulating layer to be in parallel to the other direction;
   two electrodes among each of the stripe-shaped electrodes as the first electrodes are formed within each of the repeating units;
   each of the two stripe-shaped electrodes is formed at one end side and other end side of the repeating unit where each of those electrodes are formed;
   the second electrodes are a plurality of stripe-shaped electrodes in parallel to the other direction, and each of the stripe-shaped electrodes is connected mutually; and
   an asymmetric refractive index distribution is inducted by applying independent voltage signals as the electric signals to each of the two stripe-shaped electrodes.

10. A stereoscopic display device, comprising:
    a video display unit which emits light regarding parallax images;
    a directivity/direction control element which is capable of controlling directions of light emitted from the video display unit by an electric signal applied from outside;
    a detection unit which detects spatial position of a head part of a viewer; and a control unit which controls actions of the directivity/direction control element based on information regarding the spatial position outputted from the detection unit, wherein:

the liquid crystal lenticular lens element as claimed in claim 1 is mounted as the directivity/direction control element; and the control unit generates the electric signal corresponding to the information of the spatial position and applies the signal to each electrode provided to the liquid crystal lenticular lens element.

11. A terminal device, comprising:

the stereoscopic display device as claimed in claim 10, and an operation unit which receives an instruction from a user and outputs an instruction signal based on the instruction to the stereoscopic display device.

12. A driving method of a liquid crystal lenticular lens element of a stereoscopic display device which comprises: the liquid crystal lenticular lens element including a first substrate, a second substrate in parallel thereto, a liquid crystal layer provided between both substrates, a first electrode formed on the liquid crystal layer side of the first substrate, second electrodes comprising a plurality of stripe-shaped electrodes formed on the liquid crystal layer side of the second substrate, and a stripe-shaped repeating structure formed with repeating units placed along an arrangement direction of the second electrodes; a detection unit which detects spatial position of a head part of a viewer; and a control unit which generates and outputs an electric signal based on information regarding the spatial position outputted from the detection unit, wherein:

the detection unit acquires the positional information of the head part of the viewer;

the detection unit generates the signal based on the positional information and outputs it toward the control unit; and when the signal inputted from the detection unit shows that the viewer is located in an oblique direction from the stereoscopic display device, the control unit applies a voltage signal set in advance to the plurality of stripe-shaped electrodes to induce an asymmetric refractive index distribution based on a mirror operation with respect to a plane bisecting each of the repeating units between the second electrodes in other direction that is perpendicular to an arrangement direction.

* * * * *